US012255371B2

(12) United States Patent
Hollenbeck et al.

(10) Patent No.: US 12,255,371 B2
(45) Date of Patent: Mar. 18, 2025

(54) WAVEGUIDE SWITCH WITH ISOLATION POSTS

(71) Applicant: Optisys, Inc., West Jordan, UT (US)

(72) Inventors: Michael C. Hollenbeck, West Jordan, UT (US); Robert Smith, West Jordan, UT (US)

(73) Assignee: Optisys, Inc., Salt Lake City, UT (US)

( * ) Notice: Subject to any disclaimer, the term of this patent is extended or adjusted under 35 U.S.C. 154(b) by 610 days.

(21) Appl. No.: 17/588,245

(22) Filed: Jan. 29, 2022

(65) Prior Publication Data

US 2022/0158315 A1 May 19, 2022

Related U.S. Application Data

(62) Division of application No. 16/685,145, filed on Nov. 15, 2019, now Pat. No. 11,239,535.

(60) Provisional application No. 62/769,476, filed on Nov. 19, 2018.

(51) Int. Cl.
*H01P 1/06* (2006.01)
*H01P 3/12* (2006.01)

(52) U.S. Cl.
CPC ................ *H01P 1/069* (2013.01); *H01P 3/12* (2013.01)

(58) Field of Classification Search
CPC .. H01P 1/069; H01P 3/12; H01P 1/122; H01P 1/2005
USPC ................ 333/106, 108, 254, 256, 258, 259
See application file for complete search history.

(56) References Cited

U.S. PATENT DOCUMENTS 2,999,213 A * 9/1961 Olivieri .................. H01P 1/122 333/106

* cited by examiner

*Primary Examiner* — Jorge L Salazar, Jr.
(74) *Attorney, Agent, or Firm* — TechLaw Ventures, PLLC; Terrence J. Edwards

(57) ABSTRACT

Embodiments of the invention include waveguide switch rotors, stators, waveguide switch housings and meander clamping mechanisms. Embodiments of a meander clamping mechanism may be used to connect arbitrary objects to one another. A meander clamping mechanism is particularly useful for connecting a rotor to a motor shaft and also for securing a bearing between a stator and rotor.

19 Claims, 16 Drawing Sheets

WAVEGUIDE SWITCH WITH ISOLATION POSTS

CROSS-REFERENCE TO RELATED APPLICATIONS

This U.S. patent application is a divisional of U.S. non-provisional patent application Ser. No. 16/685,145, filed, Nov. 15, 2019, titled: "WAVEGUIDE SWITCH ROTOR WITH IMPROVED ISOLATION", now U.S. Pat. No. 11,239,535 B2, issued: Feb. 1, 2022, which in turn claims benefit and priority to U.S. provisional patent application No. 62/769,476, filed, Nov. 19, 2018, titled: "WAVEGUIDE SWITCH ROTOR WITH IMPROVED ISOLATION".

This nonprovisional patent application is related to U.S. patent application Ser. No. 16/248,285 filed on Jan. 15, 2019, titled "BUILD ORIENTATION FOR ADDITIVE MANUFACTURING OF COMPLEX STRUCTURES", pending. This nonprovisional patent application is also related to U.S. nonprovisional patent application Ser. No. 16/684,153, filed on Nov. 14, 2019, titled: "HOLLOW METAL WAVEGUIDES HAVING IRREGULAR HEXAGONAL CROSS-SECTIONS FORMED BY ADDITIVE MANUFACTURING", now U.S. Pat. No. 11,211,680 B2, issued: Dec. 28, 2021. The contents of all of the patent applications recited above are hereby incorporated by reference as if fully set forth herein for all purposes.

BACKGROUND OF THE INVENTION

Field of the Invention: The present invention relates generally to mechanically-rotated waveguide switches for electromagnetic energy propagation. More particularly, this invention relates to a meander clamping mechanism finding various applications for mechanically connecting virtually any separate components together including, for example, in a waveguide switch rotor with improved isolation where rotational elements are connected, but also for non-rotational elements.

Description of Related Art: Mechanical waveguide switches are used in ground, air, and space antenna and radio frequency (RF) systems for switching an electromagnetic signal from one routing to a different routing. These mechanical waveguide switches can include multiple configurations of 1-1 (single-pole single-throw, SPST), 1-2 (single-pole dual-throw), 2-2 (dual-pole dual-throw, DPDT), and other routings of one or more inputs to one or more outputs. Current mechanical switches contain a rotor (central rotating unit) and stator (outer fixed body). The rotor and stator have waveguide channels that allow for routing of inputs to outputs for the various states, and the rotor rotates axially to achieve the different states. Current methods for designing the rotor require small gaps between rotor and stator to achieve high isolation from inputs to unconnected outputs (isolation). As of this writing, fabrication of such mechanical waveguide switches is challenging due to tight tolerance requirements on the rotor and stator that are imposed by the small gap between the rotor and stator.

However, a need still exists in the art for a waveguide switch rotor with improved isolation and ease of fabrication.

BRIEF SUMMARY OF THE INVENTION

An embodiment of a waveguide switch rotor is disclosed. The embodiment of a waveguide switch rotor may include a cylindrical rotor face extending between a rotor top and a rotor bottom with an axis of rotation passing through the rotor top and the rotor bottom, a first pair of waveguide ports disposed onto the cylindrical rotor face defining a first waveguide path passing into and out of the rotor face and a lattice of evenly-spaced isolation posts extending from the cylindrical rotor face and surrounding the pair of waveguide ports.

An embodiment of a waveguide switch housing is disclosed. The embodiment of a waveguide switch housing may include a waveguide switch rotor. The embodiment of a waveguide switch rotor may include a cylindrical rotor face extending between a rotor top and a rotor bottom, with an axis of rotation passing through the rotor top and the rotor bottom. The embodiment of a waveguide switch rotor may further include a first pair of rotor waveguide ports disposed onto the cylindrical rotor face defining a first waveguide path passing into and out of the rotor face. The embodiment of a waveguide switch rotor may further include a lattice of evenly-spaced isolation posts extending from the cylindrical rotor face and surrounding the pair of rotor waveguide ports. Finally, the embodiment of a waveguide switch housing may further include a waveguide switch stator having a cylindrical opening for receiving the waveguide switch rotor. The embodiment of a waveguide switch stator may include a first pair of stator waveguide ports corresponding to the first pair of rotor waveguide ports when the waveguide switch rotor is in a first rotational position. The embodiment of a waveguide switch stator may further include a second pair of stator waveguide ports corresponding to the first pair of rotor waveguide ports when the waveguide switch rotor is in a second rotational position.

An embodiment of a meander clamping mechanism formed into a base member for rotationally attaching a rotational member to the base member such that the rotational member is configured to rotate about an axis of rotation relative to the meander clamping mechanism formed into the base member is disclosed. The embodiment of a meander clamping mechanism may include a hollow cylindrical member having a cylindrical inner wall and a cylindrical outer wall, both of the walls extending coaxially with the axis of rotation. The embodiment of a meander clamping mechanism may further include the inner wall defining a rotational member receptacle configured to receive the rotational member. The embodiment of a meander clamping mechanism may further include the inner wall further including radial and longitudinal inner slots extending toward the outer wall. The embodiment of a meander clamping mechanism may further include the outer wall further including radial and longitudinal outer slots extending toward the inner wall. The embodiment of a meander clamping mechanism may further include the inner and outer slots being interdigitated. Finally, the embodiment of a meander clamping mechanism may further include wherein a clamping ring having a final inside diameter slightly less than an outside diameter of the outer wall, pressed axially around the outer wall and configured to flex the mechanism radially inward to grasp the rotational member disposed inside the rotational member receptacle.

Additional features and advantages of the invention will be apparent from the detailed description which follows, taken in conjunction with the accompanying drawings, which together illustrate, by way of example, features of embodiments of the present invention.

BRIEF DESCRIPTION OF THE SEVERAL VIEWS OF THE DRAWINGS

The following drawings illustrate exemplary embodiments for carrying out the invention. Like reference numerals refer to like parts in different views or embodiments of the present invention in the drawings.

DETAILED DESCRIPTION OF THE INVENTION

Figure 1:
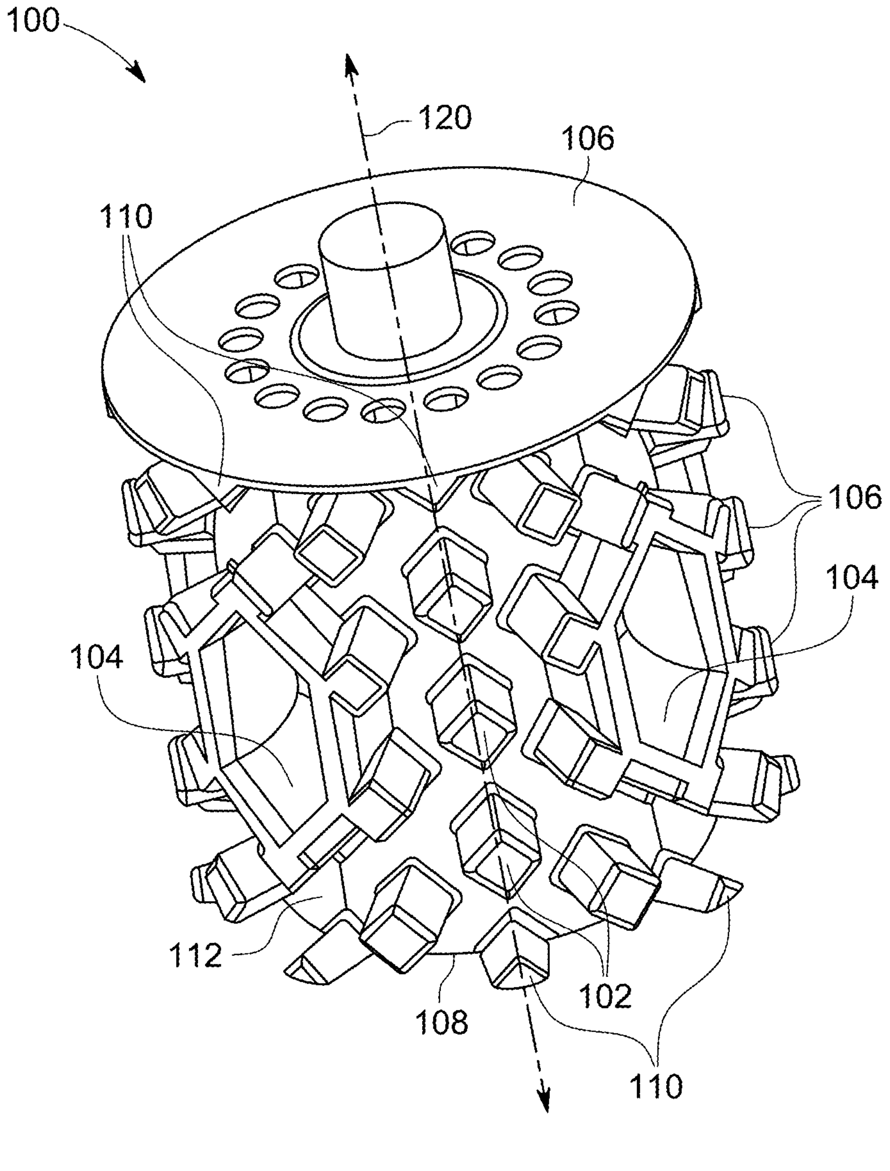
FIG. 1 is a perspective view of an embodiment of a waveguide switch rotor including isolation posts and waveguide ports, according to the present invention.

Embodiments of the invention include a waveguide switch rotor with improved isolation. The inventive geometry disclosed herein enables high isolation while having an expanded gap between the rotor and stator, which greatly simplifies manufacturing challenges and makes the design much less sensitive to feature manufacturing tolerances as well as coaxiality between the rotor and stator. Additional features of the embodiments of waveguide switch rotors include novel flexible meander attachment mechanisms for attaching a motor drive shaft to the top of the rotor, and also for attaching a rotor bearing to the bottom of the rotor. The waveguide switch rotor embodiments disclosed herein are configured for metal additive manufacturing techniques, using any suitable metal materials.

The waveguides within the switch rotor and that lead out to the stator and perhaps elsewhere may have irregular hexagonal-shaped cross-sections as shown. However, it will be understood that any waveguide cross-section may be employed with the waveguide rotor switches disclosed herein. With reference to the irregular hexagonal-shaped cross-section, it will be understood that any six-sided polygon is a hexagon. A regular hexagon is the shape we tend to think of when we say hexagon because it has equal sides and equal internal angles. However, a hexagon can have unequal sides and unequal internal angles and still be a hexagon. As the hexagonal cross-sections disclosed herein are not of the regular hexagon variety, the walls have varied length and the internal angles may vary. Such cross-sectional shapes may also be referred to herein as irregular hexagons.

The isolation posts are used to provide RF isolation between two surfaces that may include a small gap between the surfaces. Isolation posts may be arranged in a cylindrical configuration as shown in FIGS. 1-7, see related discussion below. Alternatively, isolation posts may be arranged in a planar configuration, see for example FIGS. 12-13 and related discussion below.

Hollow metal waveguide geometries for the RF path can take any traditional shape that supports TE and TM waveguide modes and fits within the volume of the rotor. The irregular hexagonal cross-sectioned waveguides shown herein are merely an example of a suitable geometry for RF waveguide path consistent with the present invention. Additional disclosure regarding irregular hexagonal cross-sectioned waveguides may be found in Applicant's U.S. non-provisional patent application Ser. No. 16/684,153, filed on Nov. 14, 2019, titled: "HOLLOW METAL WAVEGUIDES HAVING IRREGULAR HEXAGONAL CROSS-SECTIONS FORMED BY ADDITIVE MANUFACTURING", now U.S. Pat. No. 11,211,680 B2, issued: Dec. 28, 2021, the contents of which are incorporated by reference for all purposes as if fully set forth herein.

It will be understood that the cylindrical configuration of the waveguide rotors illustrated and discussed herein may have one or more switching layers, or stacks, arranged vertically (longitudinal regions) though the rotor. It will be further understood that other RF paths, resonant cavities, or features may also be included in the rotor besides simple waveguide.

An example of a single switching layer (or stack) in a waveguide switch rotor is shown in FIG. 1 and related discussion below. As noted above, switching layers can be stacked to add additional waveguide paths in a single rotor. An example of a dual-stack waveguide switch rotor is shown in FIGS. 3, 5-7 and 15, as well as related discussion below. The dual-stack waveguide switch rotor provides four paths for electromagnetic energy and switches between two separate configurations for the RF paths (four pole two throw, 4P2T).

FIG. 1 is a perspective view of an embodiment of a waveguide switch rotor 100 including isolation posts 102 and a single-stack of waveguide switching, according to the present invention. It will be understood that the term "single-stack of waveguide switching" refers to a single longitudinal region of waveguide paths. For example, in rotor 100, there are two waveguide ports 104 that define openings to a waveguide path within rotor 100 that is located generally centrally along rotor 100. Though not visible there are two additional waveguide ports 104 that are not visible in FIG. 1, but that are located in the same longitudinal region behind the two waveguide ports 104 shown. It will be further understood that RF energy enters into one of the ports 104 and is guided along the RF path of the waveguide within the rotor 100 and exits the other port 104. Thus, the waveguide path within rotor 100 may be bidirectional depending on the particular application.

Figure 2:
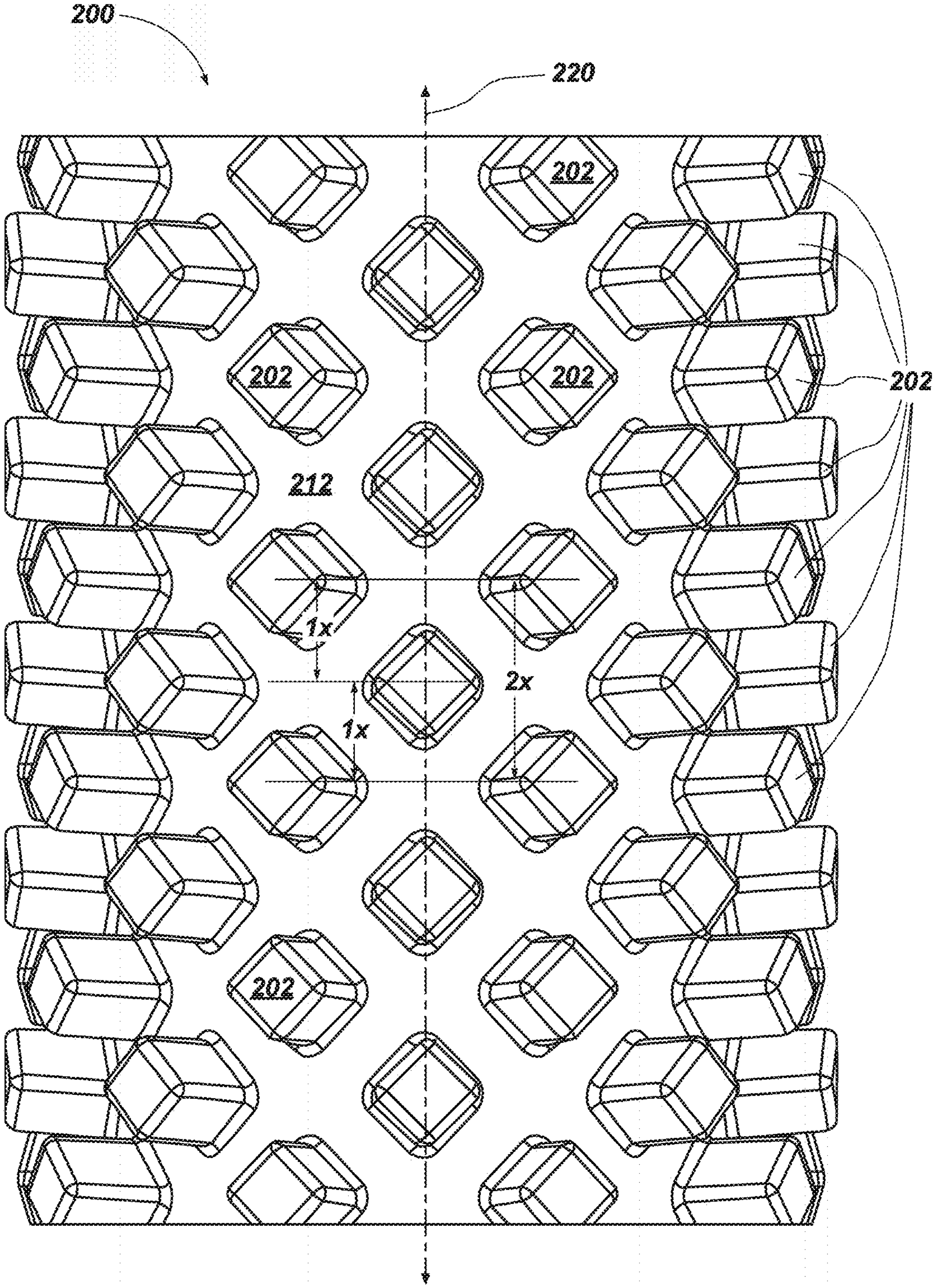
FIG. 2 is a side view of a portion of an embodiment of a waveguide switch rotor, illustrating distribution of isolation posts around rotor and without waveguide ports, according to the present invention.

FIG. 2 is a side view of a portion of an embodiment of a waveguide switch rotor 200, illustrating distribution of isolation posts 202 disposed about the rotor surface 212, according to the present invention. The portion of a waveguide switch rotor shown in FIG. 2 does not include the waveguide ports shown in FIG. 1.

As shown in FIGS. 1 and 2, posts 102 (202 in FIG. 2) are periodically spaced along a cylindrical rotor face 112 (212 in FIG. 2). Posts 102 and 202 can be configured with a wide range of available width, height, and depth to provide for an artificial magnetic boundary condition where an electromagnetic wave is stopped from propagating around the gap between rotor and stator. These configurations of posts 102 and 202 confine the energy to propagate along the desired hollow metal waveguide path as opposed to the gap between the rotor and stator.

As shown in FIGS. 1 and 2, posts 102 and 202 are spaced along the cylindrical rotor face 112, 212 and oriented axially around the axes of rotation (see dashed line arrows 120, 220) of the rotors 100 and 200, respectively. As best shown in FIG. 2, every other vertical row of posts 202 is offset by one half (1×) of the spacing between vertically aligned posts (2×) to allow for improved density of posts 202 and consequently improved isolation. Spacing between posts 202 is defined both axially around, and longitudinally along, the axis 220 of the rotor 200. The illustrated post spacing center-to-center and depth (height of each post 202 as measured from rotor face 212 to top of post 202) prevents propagation of an electromagnetic signal over a desired bandwidth in the spaces (gaps) between waveguide openings in the rotor and stator. A particularly useful feature of the novel post spacing, orientation and depth of the embodiments herein is that individual posts can vary about their ideal spacing location/depth and still perform the function of providing isolation between waveguide openings (see for example 104 in FIG. 1). Additionally, the posts 102 and 202 need not necessarily protrude perpendicular to the rotor face surface 112 and 212 from which they protrude and may be angled slightly to improve manufacturability, particularly for metal additive manufacturing.

As shown in FIGS. 1 and 2, the post 102 and 202 geometries illustrated in the drawings are generally rounded-edged cubes that have been rotated axially along their respective rotor faces 112, 212. As can be seen in FIG. 1, the posts 102 are generally of a square cross-sectioned cubical shape. Some of the posts 110 are truncated at the cylindrical boundaries of the rotor 100, namely, the posts 110 at the top 106 and those at the bottom 108 of the rotor 100. The truncated posts 110 have triangular cross-sections as opposed to the square cross-sections of the cubic posts 102 (202 in FIG. 2). The surface roughness of the posts 102 and 202 may be higher or lower than that of the waveguide path to enhance insertion loss and isolation requirements.

It will be understood that alternate post geometries to those illustrated in the drawings may be employed consistent with the present invention. For example, posts having cross-sections of circular or oval shape, diamonds, triangles, squares, rectangles, polygons of any number of sides and non-symmetric shapes that have the ability to be distributed in a lattice structure around the axis of rotation of the rotor are all suitable for the task of isolating the RF energy to a chosen path. Such alternative cross-sections for embodiments of isolation posts will be readily understood by one of skill in the art and thus will not be further elaborated herein or shown in the drawings.

Figure 3:
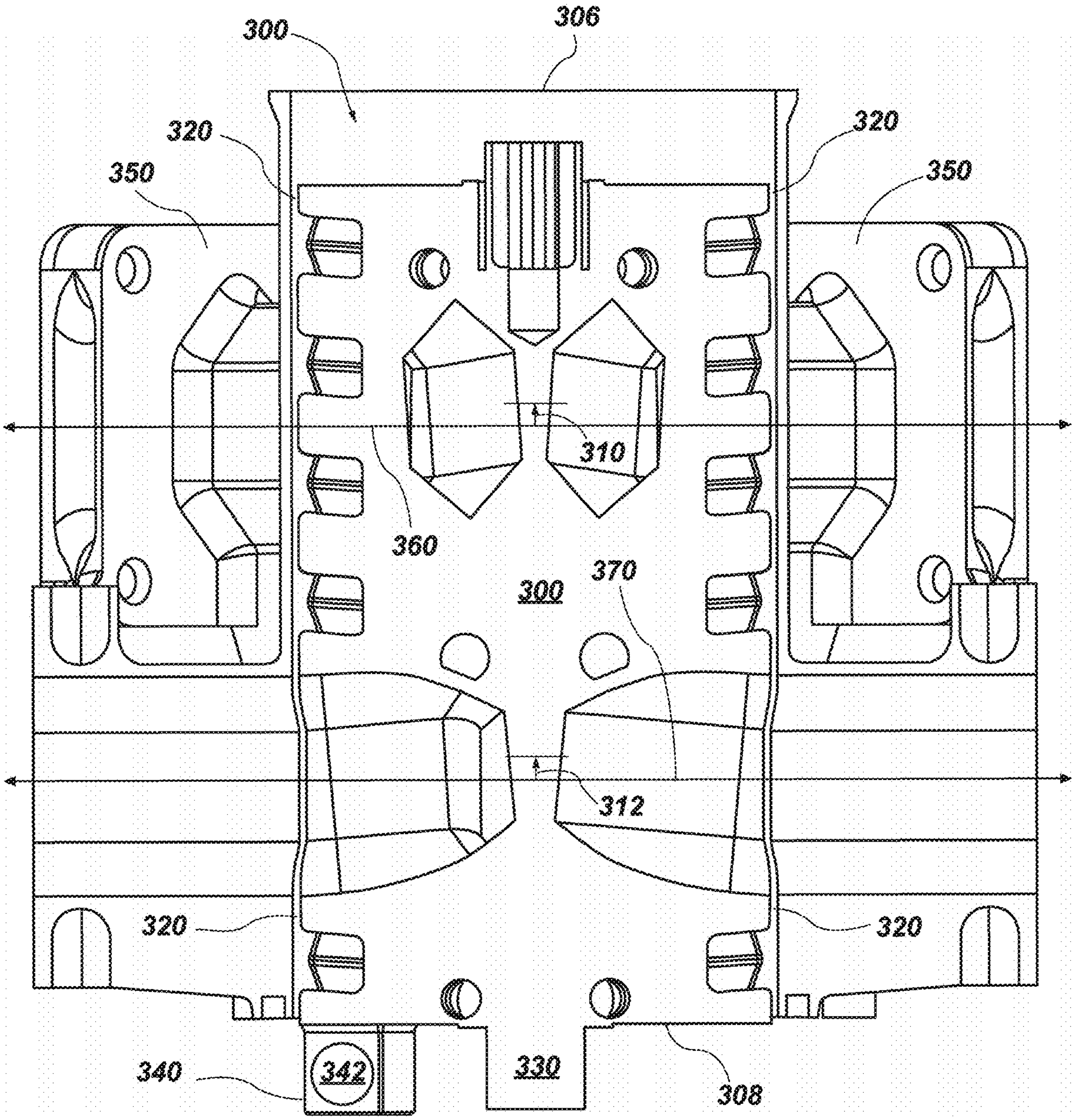
FIG. 3 is a cross-sectional view of an embodiment of a waveguide switch rotor inserted into stator geometry illustrating the gap between rotor and stator, according to the present invention.

FIG. 3 is a cross-sectional view of an embodiment of a dual-stack waveguide switch rotor 300 inserted into a stator 350 illustrating the gap 320 between rotor 300 and stator 350, according to the present invention. Note that there is an upper waveguide path (see solid double arrow 360), located closer to the top 306 of rotor 300 and a lower waveguide path (see solid double arrow 370) located closer to the bottom 308 of rotor 300. Thus, a dual-stack waveguide rotor, such as rotor 300, includes rotor paths 360, 370 located in two distinct longitudinal regions of the rotor 300. Both paths 360 and 370 are denoted by double-arrowed horizontal lines. Note that the actual RF energy paths 360 and 370 are not linear, but are instead curved, through the rotor 300 geometry. Additionally, for improved manufacturability, the energy paths 360 and 370 may bend slightly toward the zenith or upward direction in FIG. 3 as denoted by arrows 310, 312 from energy paths 360 and 370, respectively, to centerlines (360 and 370). Stated another way, centerline waveguide paths through the rotor waveguides do not necessarily fall in planes.

FIG. 3 further illustrates a bottom keying feature 340 and bearing mount 330 located at the bottom 308 of the rotor 300. Bottom keying feature 340 may further include a magnet 342 installed therein, used to hold the rotor in one of two preselected positions. According to one embodiment, magnet 342 eliminates the need for the electric motor (not shown) to hold the rotor 300 in either state, reducing system energy demand. Magnet 342 may also gently lock the rotor 300 relative to the stator 350, holding it in the given state. Further discussion regarding rotor states is provided below with reference to FIG. 16.

Figure 4:
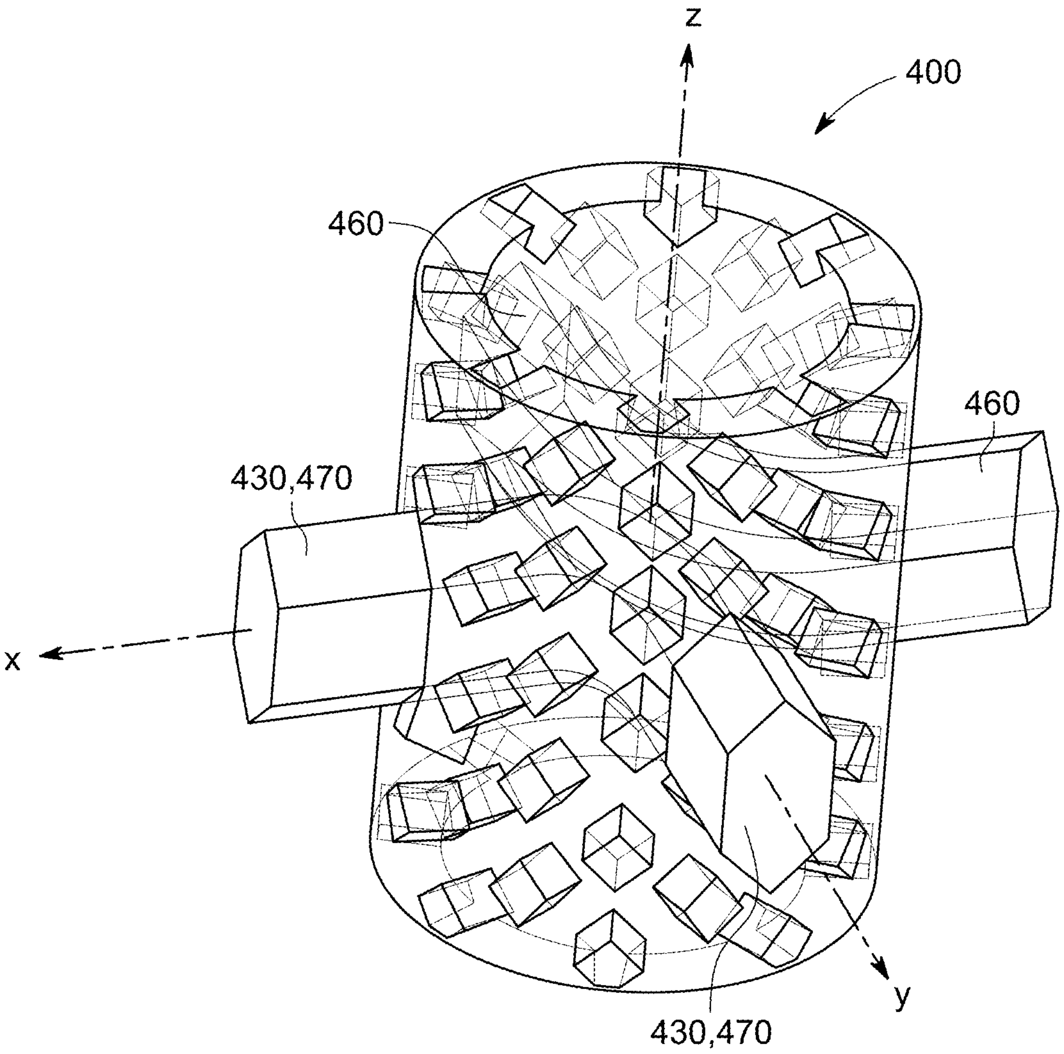
FIG. 4 is a perspective wire diagram view of an electric field passing through the primary path of an embodiment of a waveguide switch rotor, according to the present invention.

FIG. 4 is a perspective wire diagram view of an electric field 430 (shown in color shading) passing through the primary path 470 of an embodiment of a waveguide switch rotor 400, according to the present invention. Waveguide switch rotor 400 is a single-stack rotor, i.e., it has two possible waveguide paths corresponding to a single longitudinal region of the rotor 400. FIG. 4 also illustrates RF energy being isolated from the alternative, or isolation, path 460. It is particularly worth noting that there is very little E-field bleeding out the gaps between ports shown in FIG. 4. This is because of the superior isolation achieved by the lattice of isolation posts disposed on the one-stack waveguide switch rotor 400 shown in FIG. 4. It will be understood that RF energy could be directed in either direction along the primary path 470 of waveguide switch rotor 400. Whereas, in a different switch state (by rotating the rotor 400 a select angle), the RF energy could be directed along the alternative path 460, again in either direction.

Figure 16:
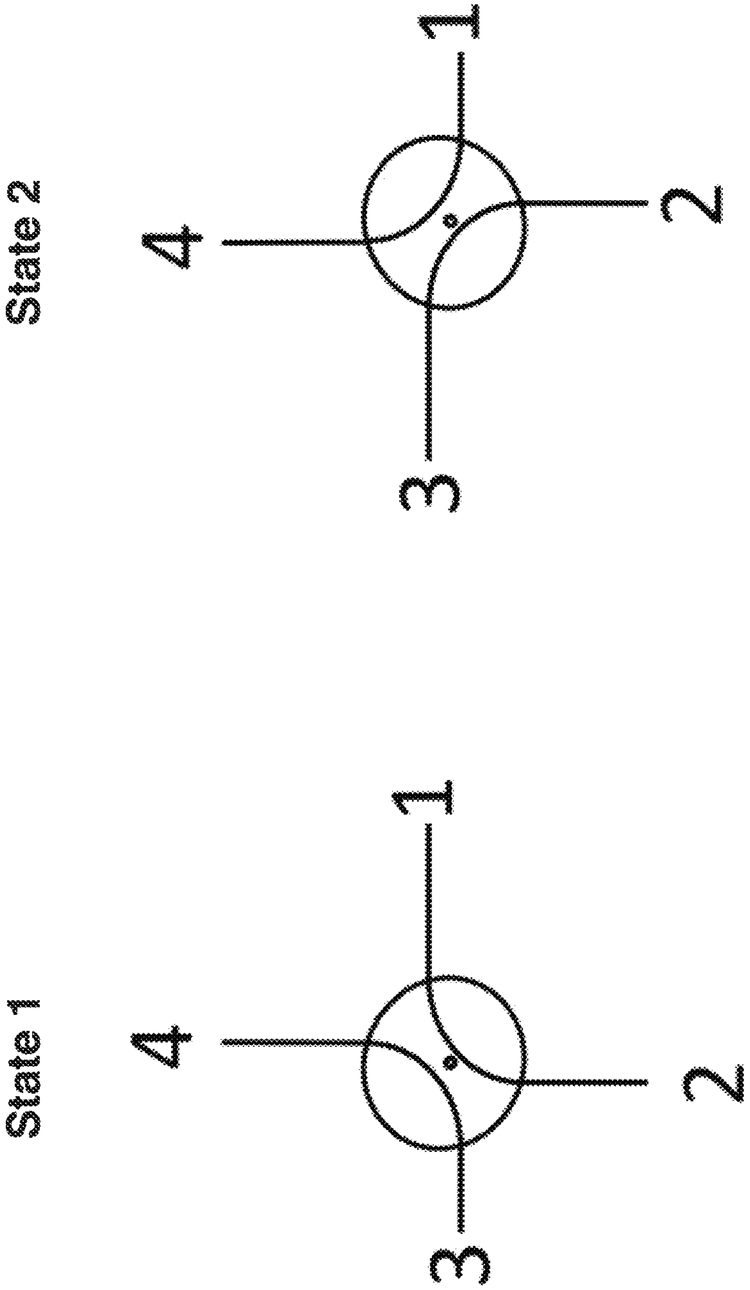
FIG. 16 illustrates state diagrams for the two possible waveguide paths for a given stack in each of the two waveguide rotor states.

FIG. 16 illustrates state diagrams for the two possible waveguide paths for a given stack in each of the two waveguide rotor states (positions). The terms "state" and "position" are used synonymously herein with reference to a particular state corresponding to a particular rotor position relative to a stator. In each of the state diagrams shown in FIG. 16 the circle represents the rotor, the central dot represents the axis of rotation and the numbers 1-4 represent ports on the rotor (and their corresponding ports on the stator, not shown). There are two waveguide paths in the single-stack rotor (see, e.g., 100, FIG. 1 or 400, FIG. 4), and four waveguide paths (2 per layer) in the dual-stack rotor (see, e.g., 300, FIG. 3, or 500, FIG. 5, see discussion below). FIG. 4 illustrates the E-field passing through the primary waveguide path 470. The second path 460 does not illustrate an E-field passing through it for simplicity of illustration. But it will be understood that the second path may or may not have electromagnetic energy passing through it. Referring again to FIG. 16, state 1 is illustrated on the left and state 2 is illustrated on the right. In state 1, ports 1 and 2 define a first path and ports 3 and 4 define a second path. In state 2 (achieved by rotation of the rotor relative to the stator), ports 1 and 4 define a first path and ports 2 and 3 define a second path. It will further be understood that any of the paths may be open to electromagnetic energy transmission in either direction. Alternatively, any of the ports may be closed off or terminated in a load, depending on the application.

Figure 5:
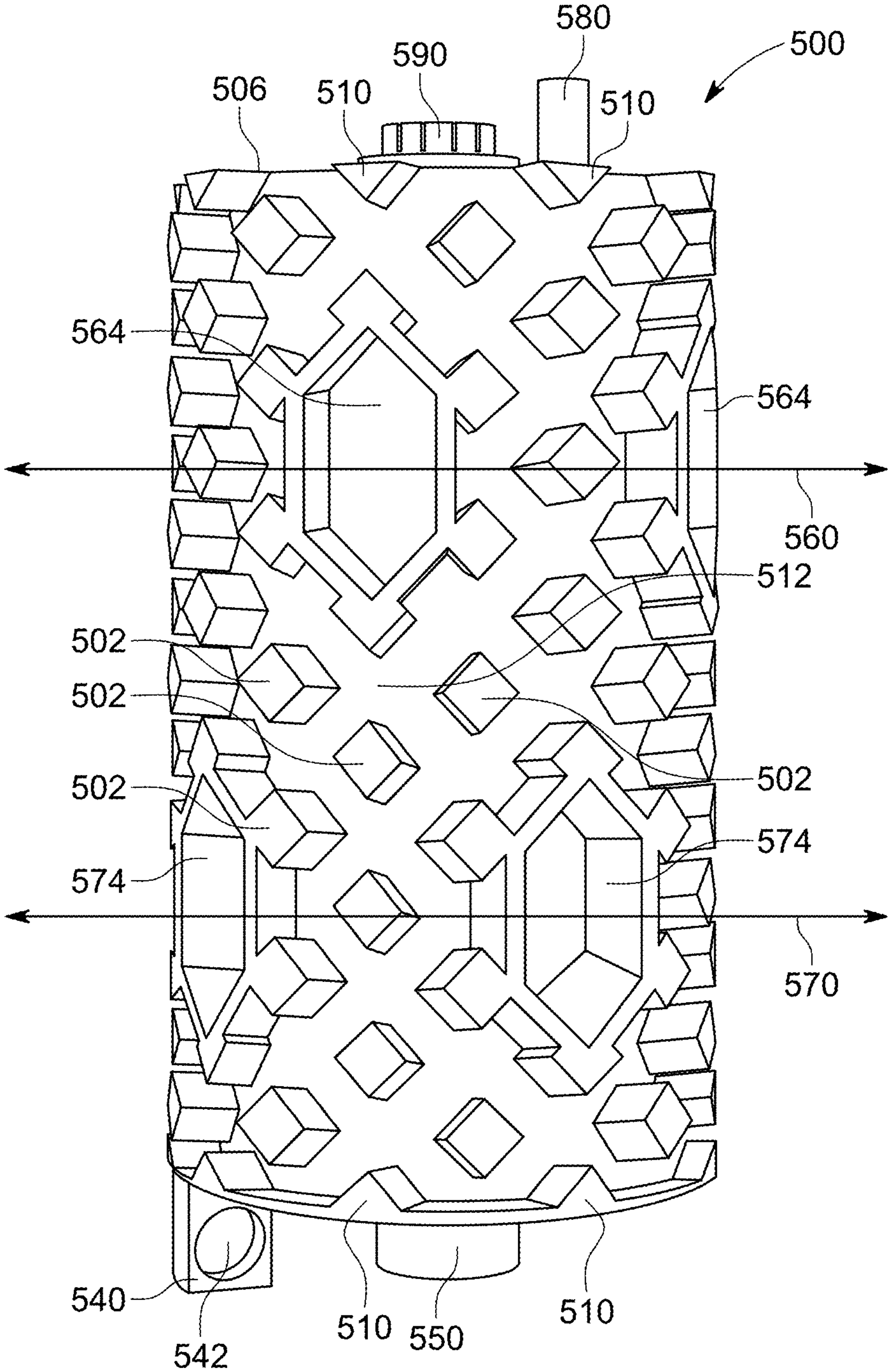
FIG. 5 is a side view image of an embodiment of a waveguide switch rotor fabricated with a two-stack of switches (four-pole two-throw, 4P2T), according to the present invention.

FIG. 5 is a side view image of an embodiment of a waveguide switch rotor fabricated with a two-stack of switches (four-pole two-throw, 4P2T), according to the present invention. Fabrication was achieved using metal additive manufacturing (metal AM) techniques. Additional disclosure regarding metal AM techniques and build orientation may be found in Applicant's U.S. patent application Ser. No. 16/248,285 filed on Jan. 15, 2019, titled "BUILD ORIENTATION FOR ADDITIVE MANUFACTURING OF COMPLEX STRUCTURES", the contents of which are incorporated by reference for all purposes as if fully set forth herein.

FIG. 5 also illustrates upper waveguide path 560 (shown in double-arrowed line) and its two associated ports 564. FIG. 5 further illustrates lower waveguide path 570 (shown in double-arrowed line) and its two associated ports 574. Note again that the actual RF energy paths 560 and 570 are not linear but curved through the rotor 500 geometry with a centerline that may not lie in planes and that are configured to mate with matching ports in a stator (not shown). Isolation posts 502 are distributed radially and spaced regularly about the surface 512 of rotor 500. Note also that the top 506 and bottom 508 of rotor 500 may also have partial, or triangular cross-sectioned isolation posts 510 consistent with the pattern of regularly spaced isolation posts 502.

FIG. 5 also illustrates a top keying feature 580 disposed at the top 506 of rotor 500, used to rotationally align and lock the rotor relative to a stator (not shown). FIG. 5 further illustrates a meander motor clamping feature 590 built into the top 506 of rotor 500 that can be used to affix the rotor 500 to an electric motor shaft (not shown) driven by an electrical motor (also not shown). The structural features of the meander motor clamping feature 590 and how it is used to clamp to a motor shaft (not shown in FIG. 5) are discussed in more detail in reference to FIG. 6 and FIG. 8, below.

FIG. 5 further illustrates a bottom keying feature 540 and bearing mount 550 on the bottom 508 of rotor 500. The bottom keying feature 540 extends from the bottom 508 of rotor 500 at a location adjacent to cylindrical rotor face 512. The bottom keying feature may further include a receptacle 542 for receiving a magnet (not shown in FIG. 5). The embodiment of a magnet receptacle 542 may be a cylindrical-shaped opening as shown in FIG. 5. Alternatively, the magnet receptacle 542 may take any other suitable shape (not shown) for receiving a magnet (not shown), according to other embodiments. Bearing mount 550 may be cylindrical in shape and extending coaxially with the axis of rotation, as shown in FIG. 5. Bearing mount 550 is configured to fit within the inner race of a bearing (not shown in FIG. 5).

Figure 6:
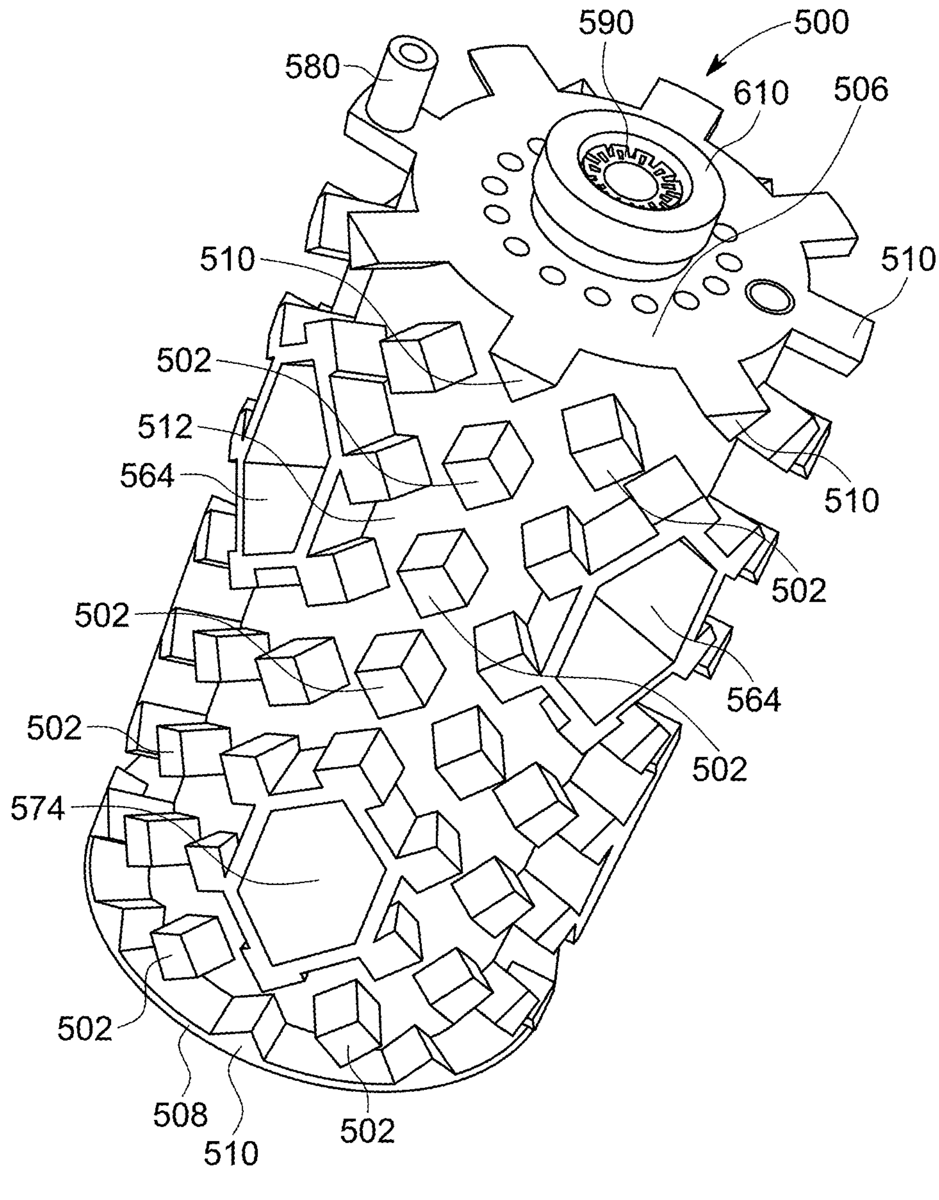
FIG. 6 is a top perspective view of the embodiment of the fabricated two-stack waveguide switch rotor shown in FIG. 5, illustrating a novel meandered clamping mechanism and clamping ring, according to the present invention.

FIG. 6 is a perspective top view of the embodiment of the fabricated two-stack waveguide switch rotor 500 shown in FIG. 5, further illustrating the top keying feature 580, novel meander motor clamping feature 590 and clamping ring 610, according to the present invention. Top keying feature 580 and meander motor clamping feature 590 are both integrated with the rotor 500 during manufacturing. The entire rotor 500 with all of its features may be fabricated as a single piece using metal AM techniques. The clamping ring 610 is formed of a hard metal material, for example and not by way of limitation, carbon steel or stainless steel. The clamping ring 610 is configured to clamp around the meander motor clamping feature 590 while the motor shaft (not shown) has been inserted axially therein.

According to one embodiment, clamping ring 610 may be formed of a hardened steel material with an inside diameter slightly less than the outside wall of the meander motor clamping feature 590 that forms a press-fit over the top of the meander motor clamping feature 590. According to another embodiment, clamping ring 610 may be formed of a heat shrinkable metal, e.g., nickel-titanium shape memory metal alloy, such as those available from Intrinsic Devices, Inc., 2353 Third St., San Francisco, CA 94107-3108. Such heat shrinkable metal alloy rings fit easily over the outer surface of the meander motor clamping feature 590, but have a final inside diameter slightly less than the outer surface of the meander motor clamping feature 590.

Thus, the clamping ring 610 is used to partially crush the meander motor clamping feature 590 around a motor shaft (not shown), thereby securing the rotor 500 to the motor shaft (not shown). The use of a clamping ring 610 with the meander motor clamping feature 590 eliminates the need for other means of securing the rotor 500 to the motor shaft (not shown). Such other means of securing the rotor 500 to the motor shaft (not shown) might, for example include use of a set screw, a threaded engagement, spot welding, or any other mechanical means known to those of ordinary skill in the art.

FIG. 6 also illustrates square cross-sectioned isolation posts 502 and partial, triangular cross-sectioned isolation posts 510 extending from the cylindrical rotor face 512. FIG. 6 further illustrates upper waveguide path ports 564 (two shown) and lower waveguide path port 574 (only one of two shown). The top keying feature 580 and meander motor clamping feature 590 are disposed on the top 506 of rotor 500, opposite the bottom 508.

Figure 7:
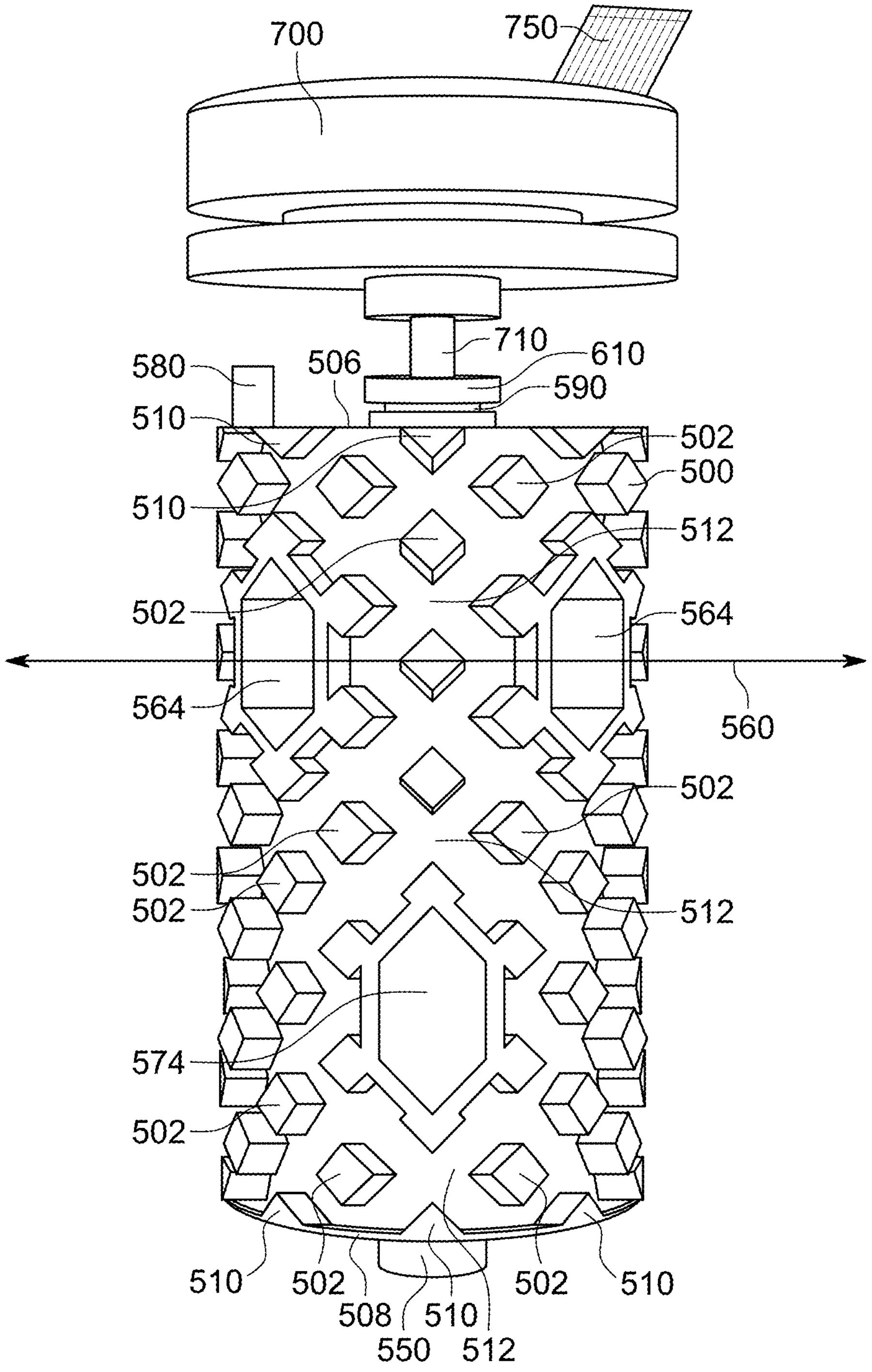
FIG. 7 illustrates a side view of the embodiment of the fabricated two-stack waveguide switch rotor shown in FIGS. 5 and 6, further illustrating an electric motor and motor shaft attached to the meandered clamping mechanism and clamping ring, according to the present invention.

FIG. 7 illustrates a side view of the embodiment of the fabricated two-stack waveguide switch rotor 500 shown in FIGS. 5 and 6, further illustrating an electric motor 700 and motor shaft 710 attached to rotor 500, according to the present invention. As shown in FIG. 7, electric motor 700 may include a control cable 750 for interfacing with motor control electronics (not shown). The motor shaft 710 fits inside the meander motor clamping mechanism 590.

The flexible meander motor clamping mechanism 590 may be used to facilitate attachment of the rotor 500 to a motor shaft 710. The general shape of the meander motor clamping mechanism 590 and embodiments disclosed herein is a hollow cylindrical member having an inner wall and an outer wall. The meandering shape of mechanism 590 allows that portion of the rotor to flex radially, while still providing rigid tangential torque transfer between the motor 700 and the rotor 500. A shaft clamping ring 610 can be applied to the outside of the meander motor clamping mechanism 590 causing the rotor 500 to pinch down on the motor shaft 710, allowing most of the clamping pressure to translate into a normal force on the shaft 710. Thus, shaft clamping ring 610 is used to flex, or clamp, the meander motor clamping mechanism 590 into a press fit with the motor shaft 710.

FIG. 7 also illustrates square cross-sectioned isolation posts 502 and partial, triangular cross-sectioned isolation posts 510 extending from the cylindrical rotor face 512 of rotor 500. FIG. 7 further illustrates upper waveguide path 560 and upper waveguide path ports 564 (two shown) and lower waveguide path port 574 (only one of two shown) of rotor 500. The top keying feature 580 and meander motor clamping feature 590 are disposed on the top 506 of rotor 500. The meander bearing clamping feature 550 is shown extending from the bottom 508 of rotor 500.

Figure 8:
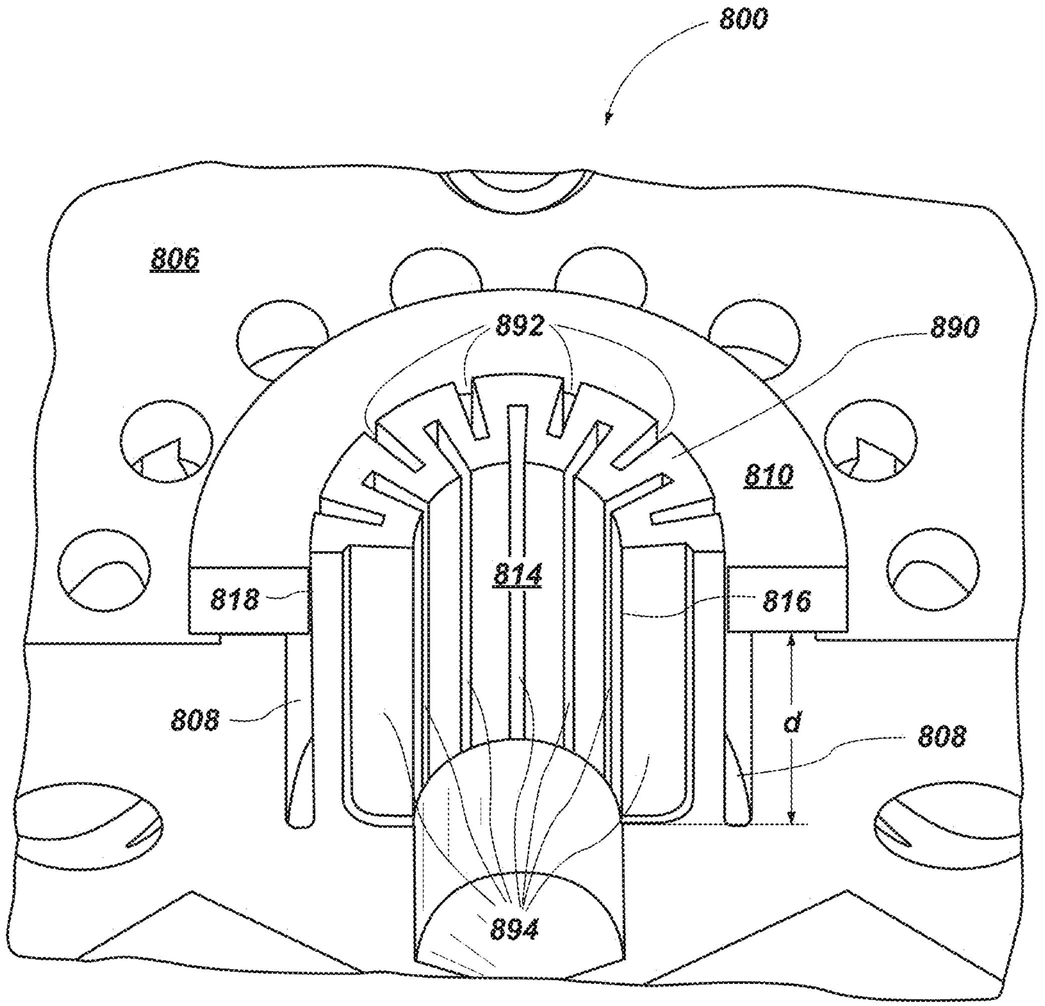
FIG. 8 illustrates a cross-sectional, perspective view of an embodiment of a meander clamping mechanism and its associated clamping ring, according to the present invention.

FIG. 8 illustrates a cross-sectional, perspective view of an embodiment of a meander clamping mechanism 890 used to facilitate rigid attachment of an embodiment of a waveguide switch rotor 800 to a motor shaft (not shown, but see, e.g., 710 in FIG. 7) with shaft clamping ring 810, according to the present invention. The meander clamping mechanism 890 is disposed on the top 806 of rotor 800, and surrounds a motor shaft bore hole 814 configured to receive the motor shaft (not shown, but see, e.g., 710 in FIG. 7).

The meander clamping mechanism 890 gets its name from the cross-sectional appearance of a path winding circumferentially around the meander clamping mechanism 890 and in between the outer slots 892 and inner slots 894 formed longitudinally into the structure of the meander clamping mechanism 890. The external slots 892 and internal slots 894 extend longitudinally along the meander clamping mechanism 890, running parallel to the axis of rotation.

The meander clamping mechanism 890 may further include a ringed slot 808 formed into the top surface 806 of the waveguide switch rotor 800. The depth, d, of the ringed slot 808 may coincide with the depth of the inner 894 and outer 892 slots of the meander clamping mechanism 890 as shown in FIG. 8. The depth, d, of the ringed slot 808 may be measured from top 804 of the meander clamping mechanism 890 and extends the outer wall 818 of the meander clamping mechanism 890 to a depth, d, below the top 804 of the meander clamping mechanism 890. The purposed of the ringed slot 808 is to structurally separate the meander clamping mechanism 890 from radial support of the waveguide switch rotor 800. This allows the meander clamping mechanism 890 to radially flex in toward the axis of rotation (not shown in FIG. 8, but see, e.g., 120 in FIG. 1) while still preserving torsional rigidity.

The particular shape of these outer 892 and inner slots 894 formed into the meander clamping mechanism 890 allow the remaining structure of the meander clamping mechanism 890 to flex radially in toward the axis of rotation by using a shaft clamping ring 810. By placing the shaft clamping ring 810 around the meander clamping mechanism 890 with a motor shaft inserted into the motor shaft bore hole 814, the waveguide switch rotor 800 becomes mechanically secured to the motor shaft (not shown, but see, e.g., 710 in FIG. 7). It will be understood that the novel structure of this meander clamping mechanism 890 will find application in many other contexts.

For example and referring now to FIG. 9, the novel structure of a meander bearing clamping mechanism 990 will be discussed in detail. The meander bearing clamping mechanism 990 may be used to mount a rotor bearing 930 between a stator 922 and a waveguide switch rotor 900. A bearing clamp ring 940 is employed to squeeze the meander shape of the meander bearing clamping mechanism 990 down onto the outside (outer race 932) of the rotor bearing 930. In this way, the bearing 930 can be mounted without a press fit. Additionally, using a bearing clamp ring 940 and meander bearing clamping mechanism 990 provides a wider range of manufacturing tolerances. This meander structural feature greatly reduces the manufacturing complexity. For additional detail, refer to FIGS. 9-11 and related discussion below.

Figure 9:
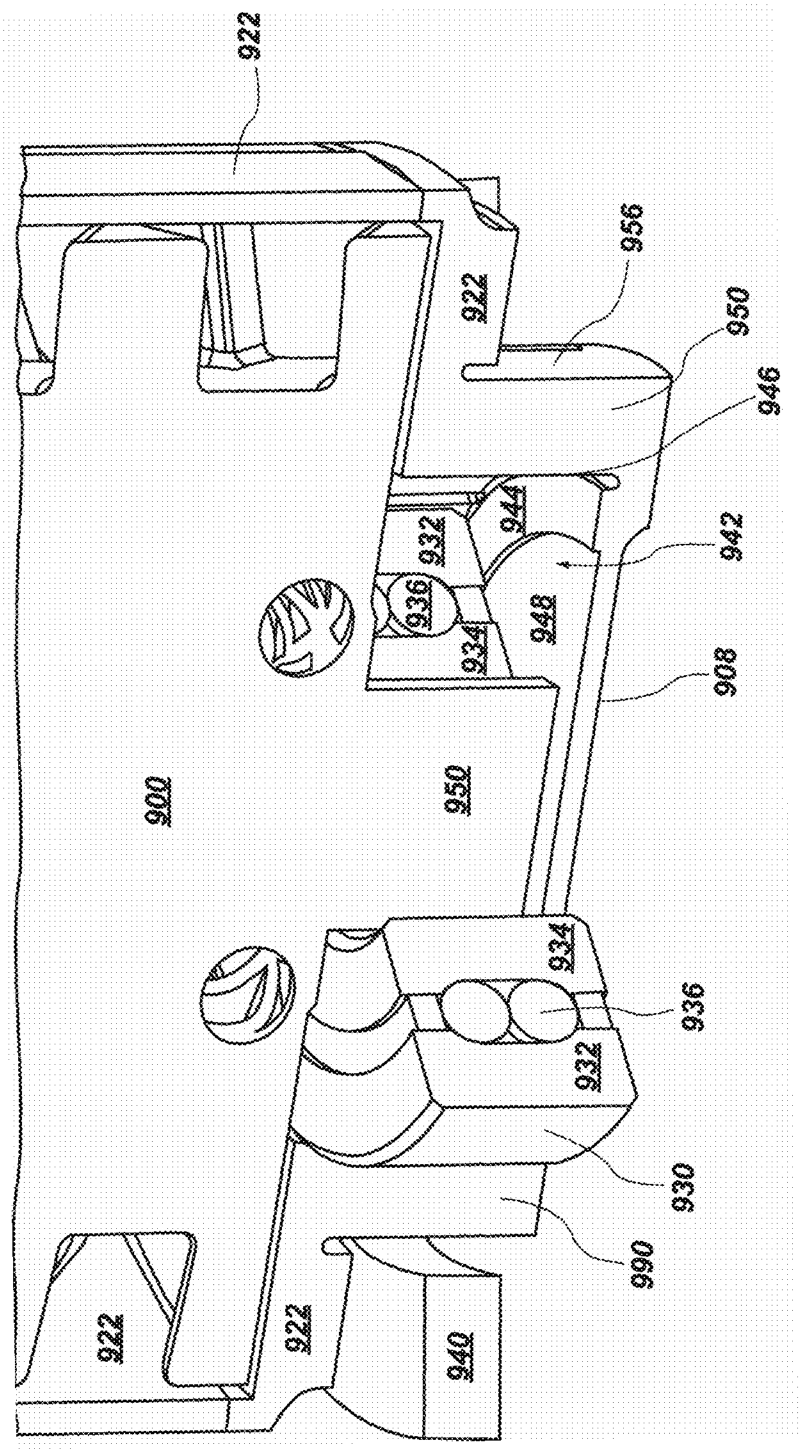
FIG. 9 illustrates a cross-sectional view of an embodiment of a meander clamping mechanism used to clamp around a rotor bearing, according to the present invention.

More particularly, FIG. 9 illustrates a cross-sectional view of an embodiment of waveguide switch rotor 900 with its bearing mount 950 used to secure a rotor bearing 930, according to the present invention. As shown in FIG. 9, the bearing mount 950 may be surrounded by the inner race 934 of a rotor bearing 930. The inner 934 and outer 932 races are shown encasing ball bearings 936 within the rotor bearing. The outer race 932 of rotor bearing 930 is surrounded by the meander bearing clamping feature 990 formed integrally with the stator 922.

The meander bearing clamping feature 990 may be a hollow cylindrical member having an inner wall 946 and an outer wall 956. The rotor bearing 930 is configured to fit within the inner wall 946 of the meander bearing clamping feature 990. The bearing clamping ring 940 is configured to clamp inward on the outer wall 956, thereby flexing the meander bearing clamping feature 990 axially inward to hold the outer 932 of the bearing fixed against the stator 922.

The meander bearing clamping feature 990 may be affixed to the outer race 932 of rotor bearing 930 by means of bearing clamp 940. It will be understood that rotor bearing 930 may be any suitable bearing mechanism, whether sealed cartridge or otherwise such that it can be placed over the bearing mount 950 and surrounded by the meander bearing clamping mechanism 990, thus leaving the rotor 900 free to rotate about the axis of rotation relative to the stator 922.

The stator 922 may be configured with cylindrical bearing receptacle 942 having an elevated outer race support 944 running circularly adjacent to an inner wall 946 of bearing receptacle floor 948. Once the rotor bearing 930 is secured within the cylindrical bearing receptacle 942, the outer race 932 rests on the outer race support 944 and is surrounded by the inner wall 946 of the flexible meander bearing clamping mechanism 990. Whereas, the inner race 934 of the rotor bearing 930 floats above the bearing receptacle floor 948 and is secured to the bearing mount 950 of the rotor 900. Please note that the rotor bearing mechanism has been described with regard to a particularly novel and nonobvious embodiment. However, it will be understood that alternative bearing structures could be utilized to allow the rotor 900 to rotate relative to the stator 922. Such alternative bearing structures fall within the teachings of the present invention, will also be understood by one of ordinary skill in the art and thus will not be further elaborated herein.

Figure 10:
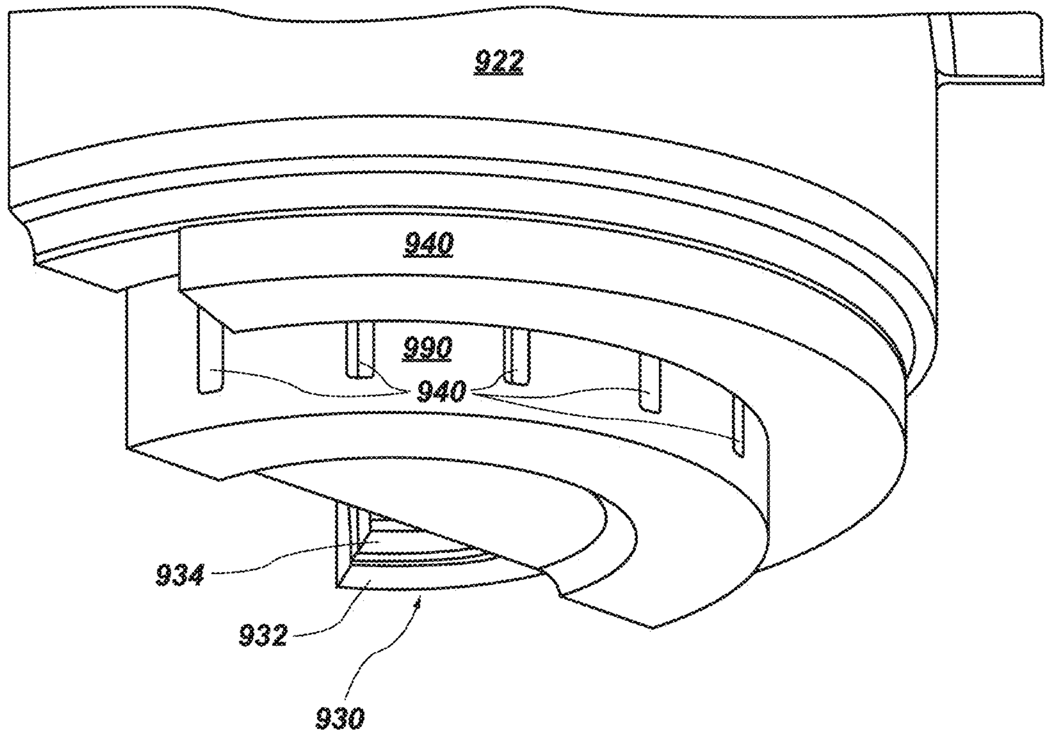
FIG. 10 illustrates an outside, bottom perspective view of the cross-sectional view shown in FIG. 9, according to the present invention.

FIG. 10 illustrates an outside, bottom perspective view of the cross-sectional view shown in FIG. 9, according to the present invention. The meander clamping mechanism 990 in conjunction with the bearing clamping ring 940 is used to secure a rotor bearing 930 within a cylindrical bearing receptacle 942 (FIG. 9) in the bottom of the stator 922. As shown in FIG. 10, the meander bearing clamping mechanism 990 includes external slots 994 (five shown) and corresponding internal slots (not shown in FIG. 10, but see 992, FIG. 11). Bearing clamp 940 flexes the internally and externally slotted (994) meander clamping mechanism 990 of stator 922 to clamp down on the outer race 932 (FIG. 9) of rotor bearing 930.

Figure 11:
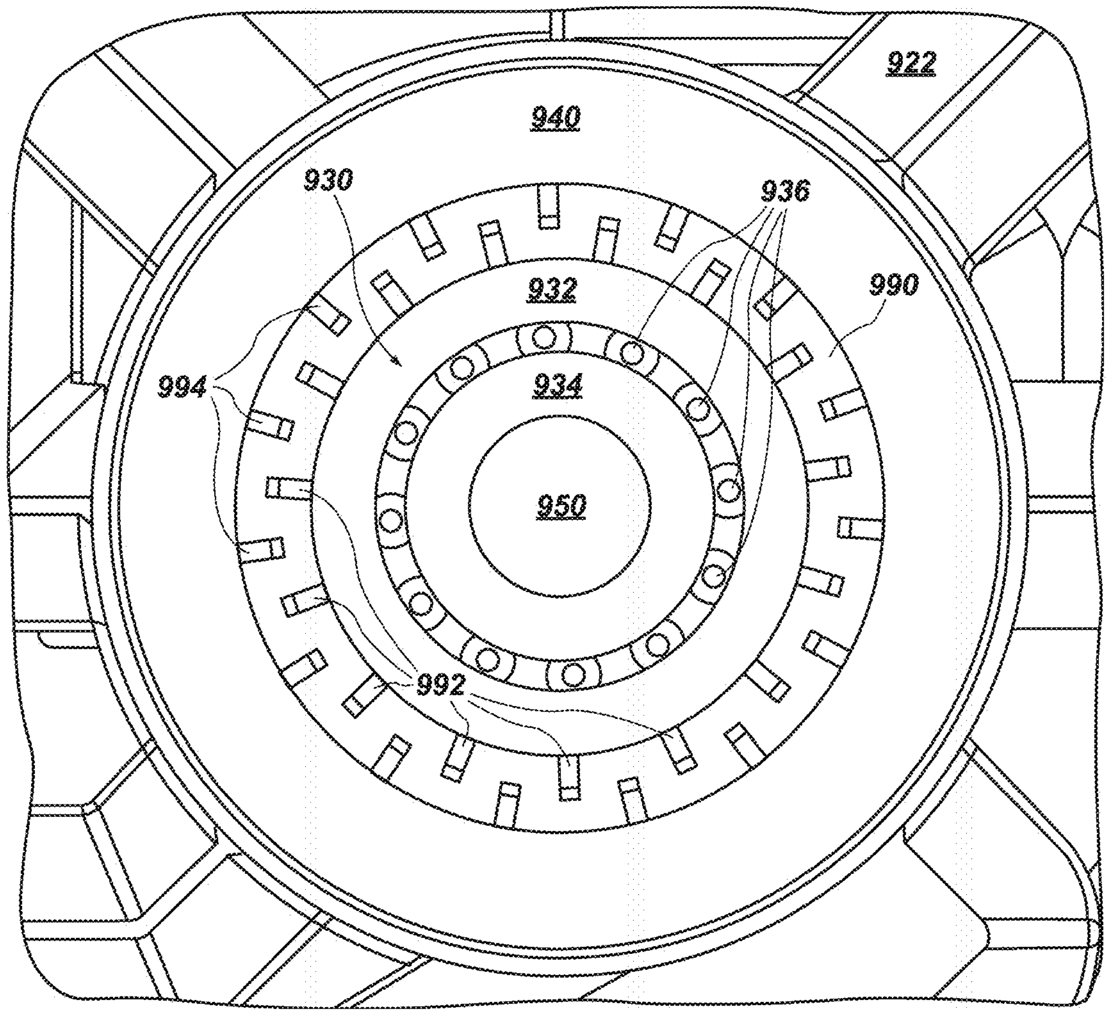
FIG. 11 is an axial cross-sectional view through the embodiment of a meander clamping mechanism illustrated in FIGS. 9 and 10, according to the present invention.

FIG. 11 is an axial cross-sectional view through the embodiment of a meander clamping mechanism 990 illustrated in FIGS. 9 and 10, according to the present invention. The meander clamping mechanism 990 is a structural feature of stator 922 that may be secured to the outer race 932 of rotor bearing 930 using a clamping ring 940. The inner race 934 of rotor bearing 930 is press fit around the bearing mount 950 of rotor 900 (not shown in FIG. 11, except for bearing mount 950).

The various embodiments of cylindrical lattices of isolation posts configured for the purpose of isolating electromagnetic energy that might bleed through the gap between waveguide switching elements have been illustrated and described with cylindrical waveguide switch rotors, 100, 200, 300, 400, 500, 800 and 900. However, it will be understood that this electromagnetic field isolation feature is not limited to port gaps defined by cylindrical, or curved surfaces. Isolation posts of various configurations may be placed at interfaces of any topology, not just cylindrical.

Figure 12:
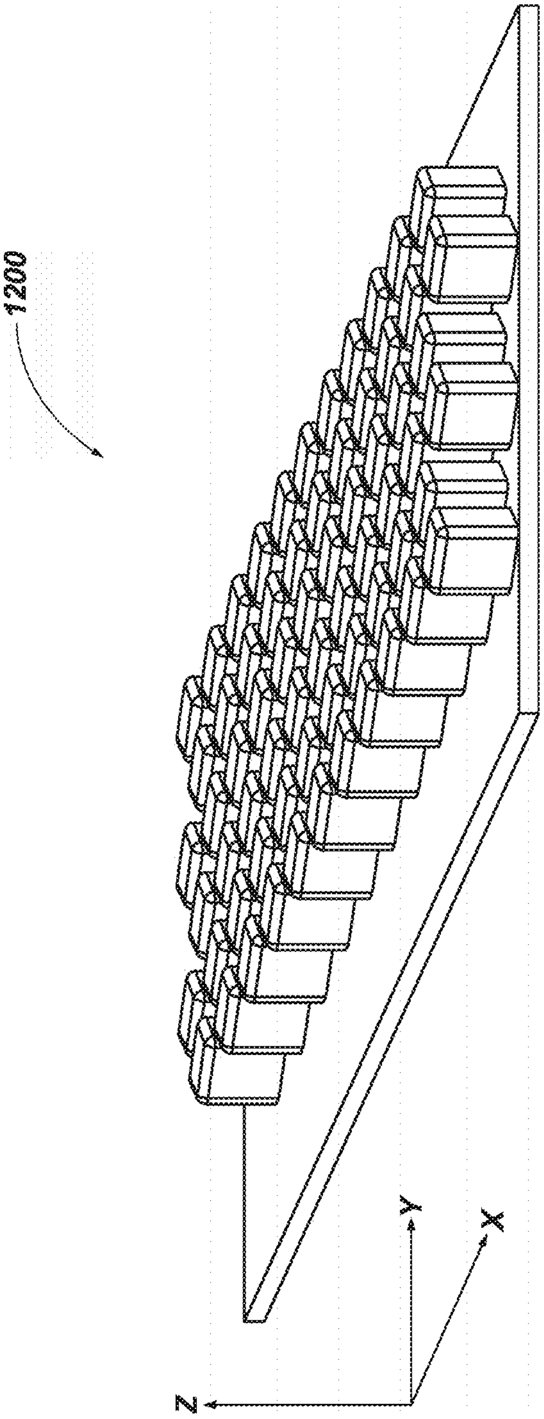
FIG. 12 is a perspective view of an embodiment of a planar artificial perfect magnetic conductor (PMC) structure optimized for metal additive manufacturing techniques, according to the present invention.
Figure 13:
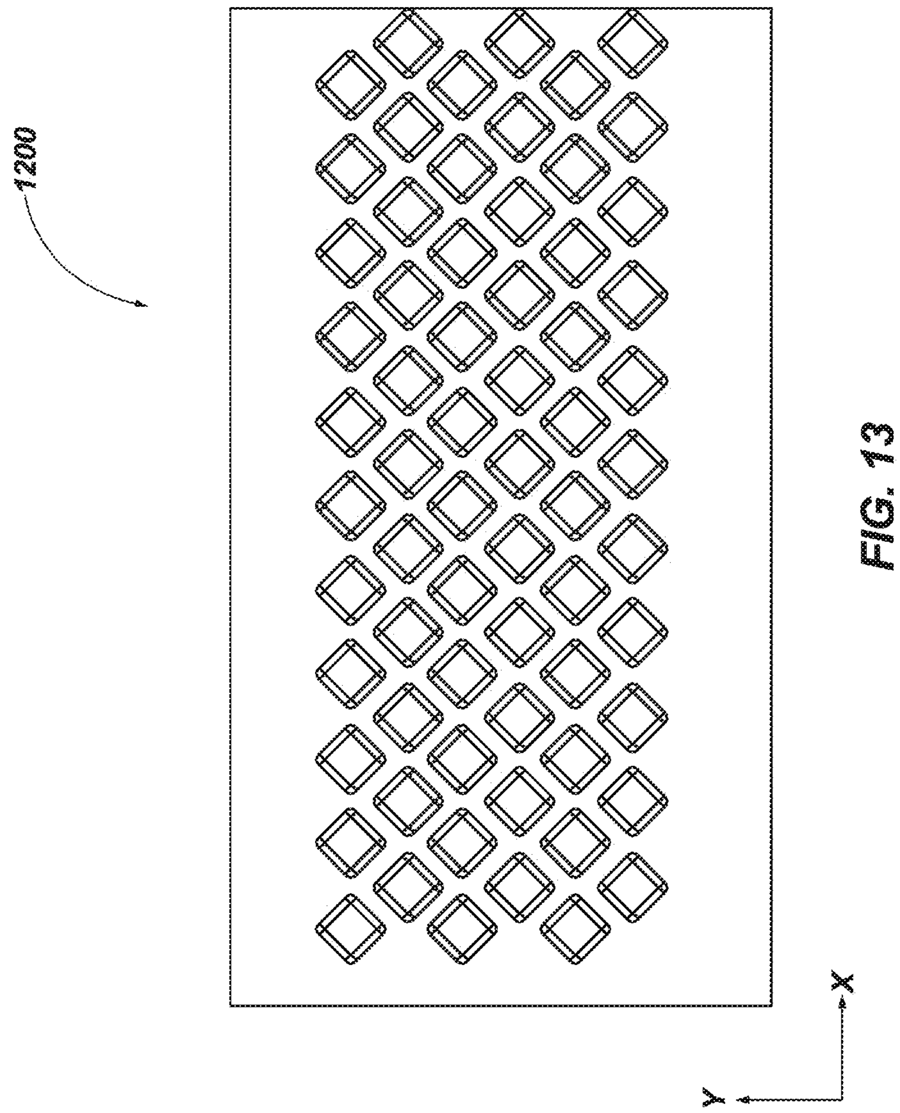
FIG. 13 is a top view of the embodiment of a planar artificial PMC structure shown in FIG. 12, according to the present invention.

For example and not by way of limitation, FIG. 12 is a perspective view of an embodiment of a planar artificial perfect magnetic conductor (PMC) structure 1200 optimized for metal additive manufacturing techniques, according to the present invention. FIG. 13 is a top view of the embodiment of a planar artificial PMC structure 1200 shown in FIG. 12, according to the present invention. An artificial PMC structure 1200 may be formed of any suitable metal material. Thus, according to yet another waveguide switch, the gap between ports may be planar as suggested in FIGS. 12 and 13, or in fact, any given topology.

Figure 14:
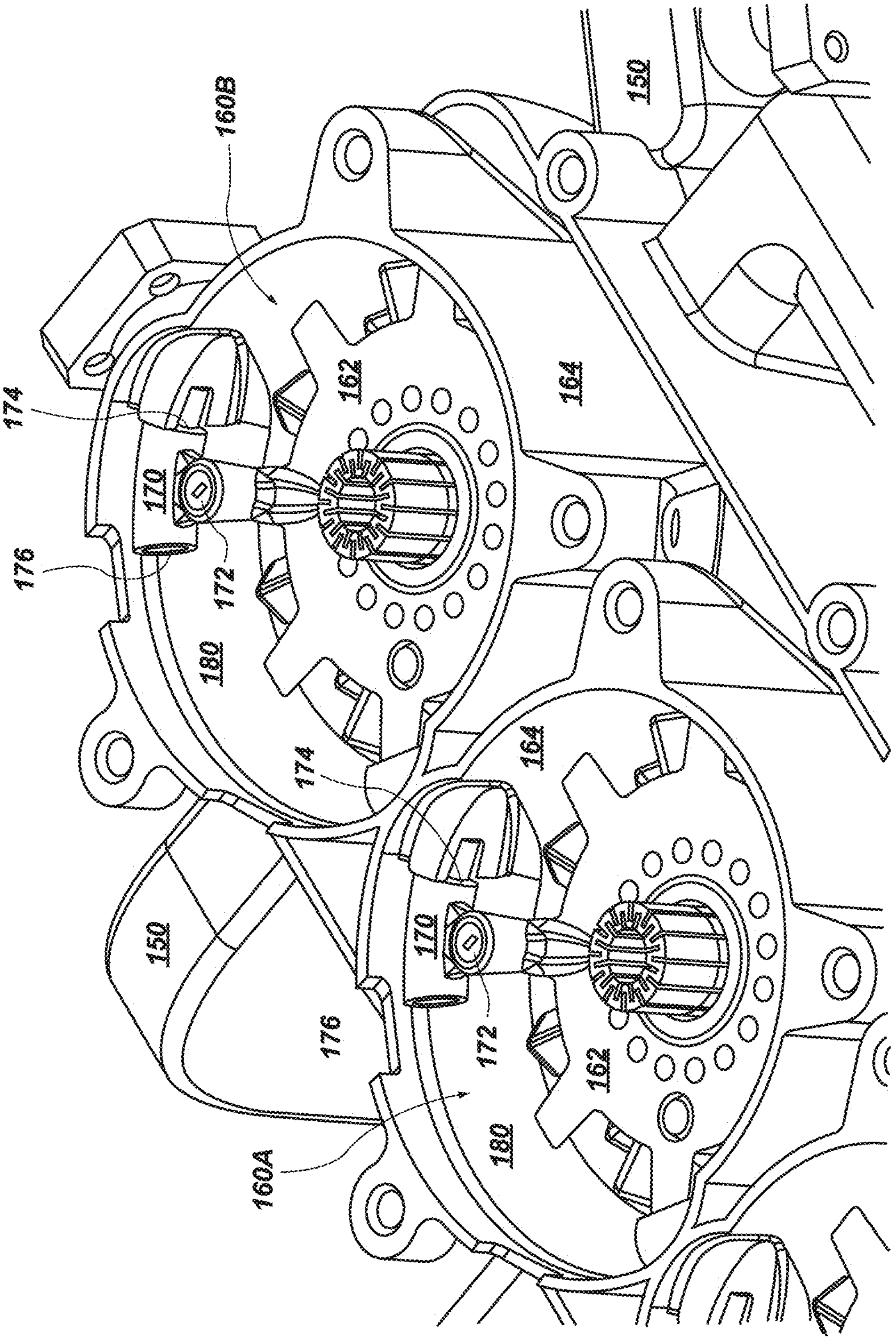
FIG. 14 is a perspective top view of a waveguide switch housing illustrating multiple rotor/stator switches and a 3-magnet key mounted to the keying and mechanical stop feature of each rotor within a stator, according to the present invention.

FIG. 14 is a perspective top view of a waveguide switch housing 150 illustrating multiple rotor/stator switches (two shown fully at arrows 160A and 160B) and a top key 170 mounted to the top keying feature (not shown) of each rotor 162 as mounted within its respective stator 164, according to the present invention. There are 3 magnets 172, 174 and 176 on each top key 170, one upward pointing magnet 172, a left pointing magnet 174 and a right pointing magnet 176. Magnets 174 and 176 are pointing out to both sides of the top key 170 like the eyes of a hammerhead shark.

The top key 170 as mounted to the top keying feature (not visible) of the rotor 162, extends beyond the radius of the rotor 162 and fits into a rotational slot 180 in the stator 164. Because each top key 170 fits within the rotational slot 180, the rotor 162 cannot be installed incorrectly in the stator 164. The magnets 174, 176 on either side help latch (or lock) the rotor 162 into either of the two switch positions so that the motor (not shown) need not maintain continuous power, thus saving system energy use. The upward facing magnet 172 serves to interface with a sensor (not shown) so that a circuit card can identify the active position of the rotor 162. This feature is a type of electrical keying.

Figure 15:
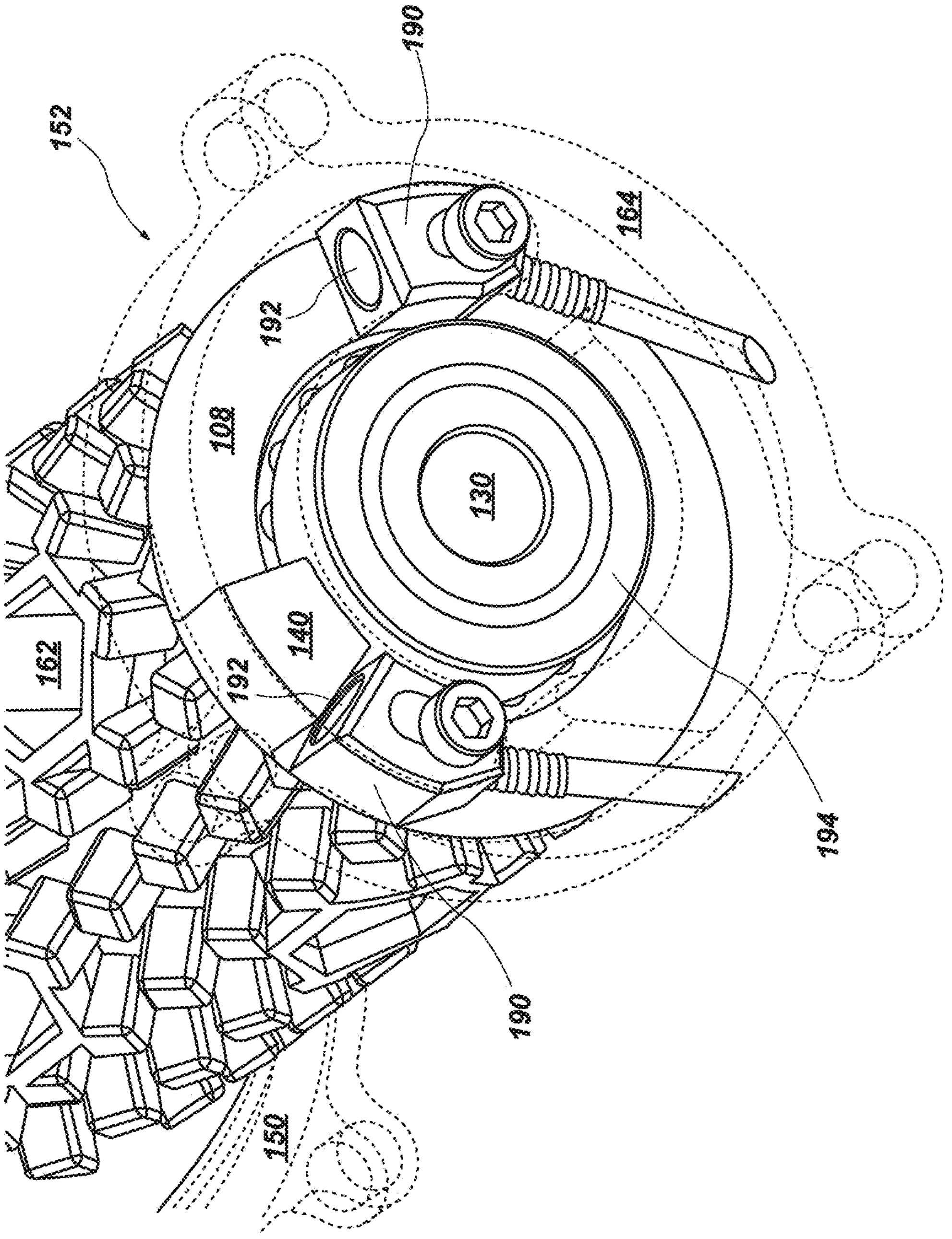
FIG. 15 is a perspective bottom view of a rotor/stator switch illustrating another embodiment of a keying and mechanical stop employing a 2-magnet key, according to the present invention.

FIG. 15 is a perspective bottom transparent view of a rotor/stator switch, see generally arrow 152, portion of the waveguide switch housing 150 shown in FIG. 14. More particularly, FIG. 15 illustrates an embodiment of a bottom key 140 feature, according to the present invention. Bottom key 140 includes two magnets installed on each side of the bottom key 140 (not visible in FIG. 15, however see e.g., magnet 342 in FIG. 3) which is integrated into the bottom 108 of the rotor 162. The magnets (not shown) interface with adjustable stops 190 and their integrated magnets 192. The bottom key 140 also serves as a mechanical keying mechanism to prevent an assembler from installing the rotor 162 incorrectly into the stator 164. FIG. 15 also illustrates bearing mount 130 around which the rotor bearing 194 is installed. Having disclosed various specific and general embodiments of the present invention, it will be understood that additional features may be added to the embodiments of a waveguide switch rotor, a waveguide switch stator and a waveguide switch housing disclosed herein. For example, and not by way of limitation, magnets and motor coils could be also added to various embodiments to effect precise motor control of the rotor within the stator.

Having described specific embodiments of the present invention above with reference to the drawings, additional general embodiments of waveguide switch rotors, stators, housings and meander clamping features will now be described. An embodiment of a waveguide switch rotor is disclosed. The embodiment of a waveguide switch rotor may include a cylindrical rotor face extending between a rotor top and a rotor bottom. According to this embodiment, an axis of rotation passes through the rotor top and the rotor bottom. The embodiment of a waveguide switch rotor may further include a first pair of waveguide ports disposed onto the cylindrical rotor face defining a first waveguide path passing into and out of the rotor face. The embodiment of a waveguide switch rotor may further include a lattice of evenly-spaced isolation posts extending from the cylindrical rotor face and surrounding the pair of waveguide ports.

According to another embodiment, the waveguide switch rotor may further include a second pair of waveguide ports disposed onto the cylindrical rotor face defining a second waveguide path passing into and out of the rotor face, wherein the second waveguide path does not intersect the first waveguide path. According to a single-stack embodiment, the first and the second waveguide paths are located in the same longitudinal position on the rotor. According to a dual-stack embodiment, the first and the second waveguide paths are located in different longitudinal positions on the rotor. According to still another dual-stack embodiment, two waveguide paths are located in the same longitudinal position on the rotor and two more waveguide paths are located in a different longitudinal position on the rotor. According to all three of these prior described embodiments, none of the waveguide paths intersect one another.

According to yet another embodiment of a waveguide switch rotor, the waveguide path may include at least one of the following RF features: waveguide, resonant cavity, filter, diplexer, hybrid coupler, limiter, circulator, combiner and divider. According to yet another embodiment of a waveguide switch rotor, each of the isolation posts may have a height, h, a cross-section of a square and four exposed vertices surrounding a top face. According to yet another embodiment of a waveguide switch rotor, the edges between the four exposed vertices of each of the isolation posts may be rounded.

According to still another embodiment of a waveguide switch rotor, the lattice of evenly-spaced isolation posts may be distributed in longitudinal rows running parallel to the axis of rotation, adjacent posts in each of the longitudinal rows spaced apart longitudinally by a distance, 2×, measured from center to center, wherein each of the isolation posts is oriented with two pairs of exposed vertices opposed to one another, the two pairs each oriented either parallel or perpendicular to the axis of rotation. According to still another embodiment of a waveguide switch rotor, adjacent longitudinal rows of the evenly-spaced isolation posts are offset from each other longitudinally by a distance, 1×.

According to another embodiment of a waveguide switch rotor, a centerline passing through the first waveguide path passing into and out of the rotor face does not lie in a plane. According to yet another embodiment of a waveguide switch rotor, a centerline passing through the first waveguide path passing into and out of the rotor face does not fall in a line.

According to yet another embodiment, a waveguide switch rotor may further include a bearing mount disposed on the rotor bottom and extending coaxially with the axis of rotation. According to one embodiment, the bearing mount is a cylindrical member. According to still another embodiment, a waveguide switch rotor may further include a keying feature extending from the rotor. According to a couple embodiments the keying feature may extend from the bottom (see, e.g., 508, FIGS. 5-7) or from the top of rotor. According to one embodiment, the keying feature extends from a location adjacent to the cylindrical rotor face and in a direction parallel to the axis of rotation. According to still yet another embodiment, the keying feature may further include a magnet receptacle configured for receiving a magnet. According to various embodiments, the magnet receptacle may be any shape, for example and not by way of limitation cylindrical, cubic, 6-sided polyhedron or any other suitable shape for receiving a magnet.

According to yet another embodiment, a waveguide switch rotor may further include a bearing mount extending from the rotor coaxially with the axis of rotation. According to a specific embodiment, the bearing mount extends from the rotor bottom. According to one embodiment, the bearing mount may be a cylindrical member extending coaxially from the rotor bottom. Of course, other shapes may also be applied to the structure of a bearing mount as long as it may be configured to receive the inside race of a bearing.

According to still another embodiment, a waveguide switch rotor may further include a meander motor clamping feature extending from the rotor coaxially with the axis of rotation. According to a particular embodiment, the meander motor clamping feature extends from the rotor top. According to one embodiment of the waveguide switch rotor, the meander motor clamping feature may include a cylindrical inner wall and a cylindrical outer wall, the inner wall defining a motor shaft bore hole configured to receive a motor shaft, the inner wall further including longitudinal inner slots extending toward the outer wall, the outer wall further including longitudinal outer slots extending toward the inner wall, wherein the inner and outer slots are interdigitated. According to a particular embodiment, the waveguide switch rotor may further be configured to receive a motor shaft within the motor shaft bore hole and a shaft clamping ring around the outer wall, wherein the clamping ring flexes the meander motor clamping feature and there by securely clamping around the motor shaft.

According to one embodiment, a waveguide switch rotor may further include a top keying feature extending from the rotor top. According to this particular embodiment the top keying feature may further extend from a location adjacent to the cylindrical rotor face and in a direction parallel to the axis of rotation. According to yet another embodiment of the waveguide switch rotor, the top keying feature may include a hollow cylindrical member. The hollow cylindrical member may be configured for receiving a top key, see, e.g., 170, FIG. 14.

An embodiment of a waveguide switch housing is disclosed. The embodiment of a waveguide switch housing may include a waveguide switch rotor. According to one embodiment of the waveguide switch housing, the waveguide switch rotor may include a cylindrical rotor face extending between a rotor top and a rotor bottom, with an axis of rotation passing through the rotor top and the rotor bottom. This embodiment of a waveguide switch rotor may further include a first pair of rotor waveguide ports disposed onto the cylindrical rotor face defining a first waveguide path passing into and out of the rotor face. This embodiment of a waveguide switch rotor may further include a lattice of evenly-spaced isolation posts extending from the cylindrical rotor face and surrounding the pair of rotor waveguide ports. The embodiment of a waveguide switch housing may further include a waveguide switch stator having a cylindrical opening for receiving the waveguide switch rotor. The embodiment of a waveguide switch stator may further include a first pair of stator waveguide ports corresponding to the first pair of rotor waveguide ports when the waveguide switch rotor is in a first rotational position. The embodiment of a waveguide switch stator may further include a second pair of stator waveguide ports corresponding to the first pair of rotor waveguide ports when the waveguide switch rotor is in a second rotational position.

According to one embodiment of the waveguide switch housing, the waveguide switch rotor may further include a bearing mount extending from the rotor coaxially with the axis of rotation and wherein the embodiment of a stator further includes a meander bearing clamping mechanism. According to one embodiment, the bearing mount extends from the rotor bottom, see, e.g., 950, FIGS. 9 and 11. According to another embodiment, the bearing mount may extend from the rotor top. According to still another embodiment, bearing mounts may extend from the rotor top and the rotor bottom. Given this disclosure, the particulars for implementing such alternative embodiments will be within the skill of one of ordinary skill in the art and thus will not be further elaborated herein.

The embodiment of a meander bearing clamping mechanism may include a cylindrical inner wall and a cylindrical outer wall, the inner wall partially defining a cylindrical bearing receptacle configured to receive a rotor bearing. The inner wall may further include longitudinal inner slots extending toward the outer wall. The outer wall may further include longitudinal outer slots extending toward the inner wall. It will be understood that the inner and the outer slots are interdigitated according to this embodiment. The embodiment of a cylindrical bearing receptacle may further include a bearing receptacle floor and the inner wall. The cylindrical bearing receptacle may be configured to receive a rotor bearing. The rotor bearing may include an inner race configured to receive the bearing mount of the waveguide switch rotor. The rotor bearing may further include an outer race. The inner and the outer races of the bearing are free to rotate coaxially relative to one another. The cylindrical bearing receptacle may further include an elevated outer race support disposed on the bearing receptacle floor. The elevated outer race support may appear similar to a thin washer placed on the bearing receptacle floor. The outer race of the rotor bearing may be configured for direct contact with elevated outer race support and the inner wall. According to this embodiment of the waveguide switch housing, the meander bearing clamping mechanism may further be configured to flex radially in toward the axis of rotation under compressive force applied by a bearing clamping ring applied to the outer wall. Under these conditions, the bearing clamping ring mounted on the meander bearing clamping mechanism clamps the outer race of the rotor bearing to the stator.

According to another embodiment of the waveguide switch housing, the waveguide switch rotor may further include a meander motor clamping feature extending from the rotor top coaxially with the axis of rotation. According to this embodiment of the waveguide switch housing, the meander motor clamping feature may include a cylindrical inner wall and a cylindrical outer wall. According to this embodiment, the inner wall defines a motor shaft bore hole configured to receive a motor shaft. According to this embodiment the inner wall may further include radial and longitudinal inner slots extending toward the outer wall. According to this embodiment the outer wall may further include radial and longitudinal outer slots extending toward the inner wall. According to this embodiment the inner and outer slots are interdigitated.

According to yet another embodiment of the waveguide switch housing, the waveguide switch rotor may further include a bottom keying feature extending from the rotor bottom. According to this embodiment, the bottom keying feature extends from a location adjacent to the cylindrical rotor face and in a direction parallel to the axis of rotation. According to this embodiment, the bottom keying feature may further include a magnet receptacle configured for receiving a magnet, see, e.g., and not by way of limitation, magnet receptacle 542, FIG. 5.

According to still another embodiment, the waveguide switch housing may further include a top keying feature extending from the rotor top and from a location adjacent to the cylindrical rotor face and extending in a direction parallel to the axis of rotation, the top keying feature including a hollow cylindrical member. It will be understood that a keying feature may be placed on the top or the bottom of a rotor. In fact, the keying feature may be placed anywhere relative to the port locations. It will also be understood that the relative terms “top” and “bottom” used herein are simply relative to one another and do not necessarily imply a preferred orientation. For example, the motor could be mounted on the bottom and the bearing mounted on the top in an alternative embodiment not illustrated in the drawings.

An embodiment of a meander clamping mechanism is disclosed. The embodiment of a meander clamping mechanism may be formed into a base member for rotationally attaching a rotational member to the base member such that the rotational member is configured to rotate about an axis of rotation relative to the meander clamping mechanism formed into the base member. The embodiment of a meander clamping mechanism may include a hollow cylindrical member having a cylindrical inner wall and a cylindrical outer wall, both of the walls extending coaxially with the axis of rotation. The embodiment of a meander clamping mechanism may further include the inner wall defining a rotational member receptacle configured to receive the rotational member. According to this embodiment of a meander clamping mechanism, the inner wall may further include radial and longitudinal inner slots extending toward the outer wall. According to this embodiment of a meander clamping mechanism, the outer wall may further include radial and longitudinal outer slots extending toward the inner wall. According to this embodiment of a meander clamping mechanism, the inner and outer slots are interdigitated. The embodiment of a meander clamping mechanism may further include a clamping ring having a final inside diameter slightly less than an outside diameter of the outer wall, pressed axially around the outer wall and configured to flex the mechanism radially inward to grasp the rotational member disposed inside the rotational member receptacle. Embodiments of the clamping ring may be formed of any suitable material including, but not limited to: steel or nickel-titanium shape memory metal alloy.

According to another embodiment, the meander clamping mechanism may further include a ringed slot formed into a top surface of the base member and extending the outer wall to a depth, d, below the top surface of the base member and surrounding a bottom portion of the meander clamping mechanism. This ringed slot extends the longitudinal length of the meander clamping mechanism below the top surface of the base member for additional flex and compactness in overall length.

While the foregoing advantages of the present invention are manifested in the illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A waveguide switch, comprising:

a stator;

a rotor that comprises:

a cylindrical rotor face extending between a rotor top and a rotor bottom with an axis of rotation passing through the rotor top and the rotor bottom;

a first pair of waveguide ports disposed onto the cylindrical rotor face defining a first waveguide path passing into and out of the rotor face; and a plurality of isolation posts extending from the cylindrical rotor face and surrounding the first pair of waveguide ports;

wherein the plurality of isolation posts do not physically contact the stator.

2. The waveguide switch of claim 1, further comprising a second pair of waveguide ports disposed onto the cylindrical rotor face defining a second waveguide path passing into and out of the rotor face, wherein the second waveguide path does not intersect the first waveguide path.

3. The waveguide switch of claim 1, wherein the first waveguide path comprises at least one of the following: a waveguide, a resonant cavity, a filter, a diplexer, a hybrid coupler, a limiter, a circulator, a combiner, and a divider.

4. The waveguide switch of claim 1, wherein the each of the plurality of isolation posts has a height, h, a cross-section of a square, and four exposed vertices surrounding a top face.

5. The waveguide switch of claim 4, wherein the plurality of isolation posts are distributed in longitudinal rows running parallel to the axis of rotation, wherein adjacent isolation posts in each of the longitudinal rows are spaced apart longitudinally by a distance, 2×, measured from center to center, wherein each of the plurality of isolation posts is oriented with two pairs of exposed vertices opposed to one another, wherein the two pairs of exposed vertices are each oriented either parallel or perpendicular to the axis of rotation.

6. The waveguide switch of claim 5, wherein adjacent longitudinal rows of the plurality of isolation posts are offset from each other longitudinally by a distance, 1×.

7. The waveguide switch of claim 1, wherein the plurality of isolation posts are evenly-spaced and distributed along the cylindrical rotor face.

8. The waveguide switch of claim 1, wherein a centerline passing through the first waveguide path passing into and out of the rotor face does not lie in a plane.

9. The waveguide switch of claim 1, further comprising a bearing mount disposed on the rotor bottom and extending coaxially with the axis of rotation.

10. The waveguide switch of claim 1, further comprising a keying feature extending from the rotor bottom or top and extending from a location adjacent to the cylindrical rotor face and in a direction parallel to the axis of rotation.

11. The waveguide switch of claim 10, wherein the keying feature further comprises a magnet receptacle configured for receiving a magnet.

12. The waveguide switch of claim 1, further comprising a bearing mount extending from the rotor coaxially with the axis of rotation.

13. The waveguide switch of claim 1, further comprising a top keying feature extending from the rotor top and from a location adjacent to the cylindrical rotor face and in a direction parallel to the axis of rotation.

14. The waveguide switch of claim 13, wherein the top keying feature comprises a hollow cylindrical member.

15. The waveguide switch of claim 1, wherein the stator comprises a cylindrical opening for receiving the rotor, and wherein the stator further comprises a first pair of stator waveguide ports corresponding to the first pair of waveguide ports when the rotor is in a first rotational position, and a second pair of stator waveguide ports corresponding to the first pair of waveguide ports when the rotor is in a second rotational position.

16. The waveguide switch of claim 1, further comprising a meander motor clamping feature extending from the rotor top coaxially with the axis of rotation.

17. The waveguide switch of claim 16, wherein the stator further comprises:

a meander bearing clamping mechanism comprises a cylindrical inner wall and a cylindrical outer wall, the inner wall partially defining a cylindrical bearing receptacle configured to receive a rotor bearing, the inner wall further including longitudinal inner slots extending toward the outer wall, the outer wall further including longitudinal outer slots extending toward the inner wall, wherein the inner and outer slots are interdigitated; and wherein the cylindrical bearing receptacle further includes a bearing receptacle floor and the inner wall, the cylindrical bearing receptacle configured to receive a rotor bearing, the rotor bearing including an inner race configured to receive a bearing mount of the rotor, the rotor bearing further including an outer race, the inner and the outer races being free to rotate coaxially relative to one another, the cylindrical bearing receptacle further including an elevated outer race support disposed on the bearing receptacle floor, the outer race of the rotor bearing configured for direct contact with elevated outer race support and the inner wall;

wherein the meander bearing clamping mechanism is further configured to flex radially in toward the axis of rotation under compressive force applied by a bearing clamping ring applied to the outer wall, thereby clamping the outer race of the rotor bearing to the stator.

18. The waveguide switch of claim 17, wherein the bearing mount extends from the rotor bottom.

19. The waveguide switch of claim 16, wherein the meander motor clamping feature further comprises a cylindrical inner wall and a cylindrical outer wall, the inner wall defining a motor shaft bore hole configured to receive a motor shaft, the inner wall further including radial and longitudinal inner slots extending toward the outer wall, the outer wall further including radial and longitudinal outer slots extending toward the inner wall, wherein the inner and outer slots are interdigitated.

* * * * *